US010055087B2

(12) United States Patent
Choi et al.

(10) Patent No.: US 10,055,087 B2
(45) Date of Patent: Aug. 21, 2018

(54) MOBILE TERMINAL AND METHOD OF CONTROLLING THE SAME

(71) Applicant: LG ELECTRONICS INC., Seoul (KR)

(72) Inventors: Younhwa Choi, Seoul (KR); Sooyoung Her, Seoul (KR); Jiyoung Park, Seoul (KR); Hyekyoung Han, Seoul (KR); Hyungtae Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 107 days.

(21) Appl. No.: 14/206,925

(22) Filed: Mar. 12, 2014

(65) Prior Publication Data

US 2014/0344749 A1    Nov. 20, 2014

(30) Foreign Application Priority Data

May 20, 2013    (KR) .......................... 10-2013-0056663

(51) Int. Cl.
| | | |
|---|---|---|
| G06F 3/0481 | (2013.01) | |
| G06F 3/0484 | (2013.01) | |
| G06F 3/0488 | (2013.01) | |
| H04L 12/58 | (2006.01) | |
| G06F 3/0482 | (2013.01) | |
| H04M 1/725 | (2006.01) | |

(52) U.S. Cl.
CPC ........ *G06F 3/04817* (2013.01); *G06F 3/0482* (2013.01); *G06F 3/0488* (2013.01); *H04L 51/02* (2013.01); *H04L 51/10* (2013.01); *H04M 1/72547* (2013.01); *H04M 1/72552* (2013.01); *H04M 2250/22* (2013.01)

(58) Field of Classification Search
CPC ............. G06F 3/04817; G06F 3/04842; G06F 3/0488; H04M 1/72583
See application file for complete search history.

(56) References Cited

U.S. PATENT DOCUMENTS

| | | | | |
|---|---|---|---|---|
| 5,169,342 A | * | 12/1992 | Steele | .................... G06F 3/0481 |
| | | | | 273/454 |
| 2002/0140732 A1 | * | 10/2002 | Tveskov | ................ G09B 19/04 |
| | | | | 715/763 |

(Continued)

FOREIGN PATENT DOCUMENTS

| | | |
|---|---|---|
| CN | 103079008 A | 5/2013 |
| WO | WO 02/077782 A2 | 10/2002 |

*Primary Examiner* — Kevin L Young
*Assistant Examiner* — Parmanand D Patel
(74) *Attorney, Agent, or Firm* — Birch, Stewart, Kolasch & Birch, LLP

(57) ABSTRACT

A mobile terminal is provided that includes a wireless communication unit, a display unit and a controller. The display unit is configured to display a first content including one or more constituent units that contain at least one respective semantic component. The controller is configured to analyze the one or more constituent units and respective semantic components. The controller is further configured to display icons corresponding to the respective constituent units of the first content. The controller is also configured display text related to the content on the display unit responsive to a touch input applied to an icon from among the icons corresponding to the respective constituent units of the first content.

19 Claims, 32 Drawing Sheets

(56) References Cited

U.S. PATENT DOCUMENTS

| | | | |
|---|---|---|---|
| 2004/0111272 A1* | 6/2004 | Gao | G06F 17/289 |
| | | | 704/277 |
| 2004/0141004 A1* | 7/2004 | Cabezas | G06Q 10/107 |
| | | | 715/751 |
| 2007/0155369 A1 | 7/2007 | Jobs et al. | |
| 2007/0155434 A1* | 7/2007 | Jobs | G06F 3/0236 |
| | | | 455/565 |
| 2007/0271340 A1 | 11/2007 | Goodman et al. | |
| 2008/0216022 A1* | 9/2008 | Lorch | G06F 3/04817 |
| | | | 715/847 |
| 2009/0164914 A1 | 6/2009 | Chen | |
| 2009/0282114 A1* | 11/2009 | Feng | G06Q 10/107 |
| | | | 709/206 |
| 2010/0088616 A1* | 4/2010 | Park | G06F 3/0236 |
| | | | 715/762 |
| 2010/0179991 A1* | 7/2010 | Lorch | H04M 1/7253 |
| | | | 709/206 |
| 2010/0332218 A1 | 12/2010 | Liu et al. | |
| 2011/0035453 A1* | 2/2011 | Koul | G06Q 10/107 |
| | | | 709/206 |
| 2011/0219333 A1* | 9/2011 | Park | H04M 1/72583 |
| | | | 715/808 |
| 2012/0059787 A1* | 3/2012 | Brown | G06F 17/241 |
| | | | 706/52 |
| 2012/0157039 A1* | 6/2012 | Lotter | G06F 21/552 |
| | | | 455/405 |
| 2012/0191756 A1* | 7/2012 | Son | G06F 3/0484 |
| | | | 707/780 |
| 2014/0025371 A1* | 1/2014 | Min | G06Q 10/00 |
| | | | 704/9 |
| 2014/0055826 A1* | 2/2014 | Hinski | H04N 1/3876 |
| | | | 358/473 |
| 2014/0163954 A1* | 6/2014 | Joshi | G06F 17/276 |
| | | | 704/9 |

\* cited by examiner

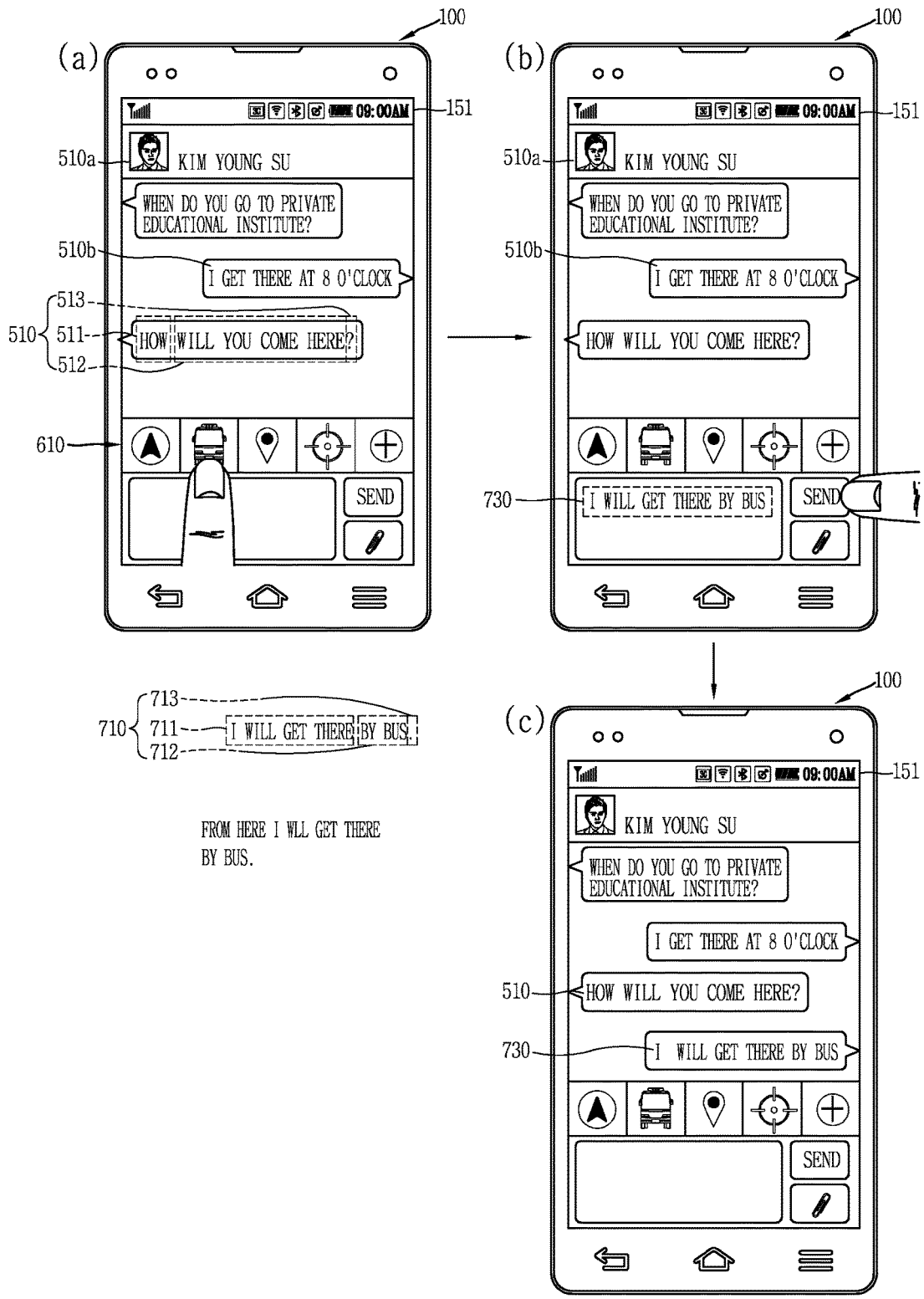

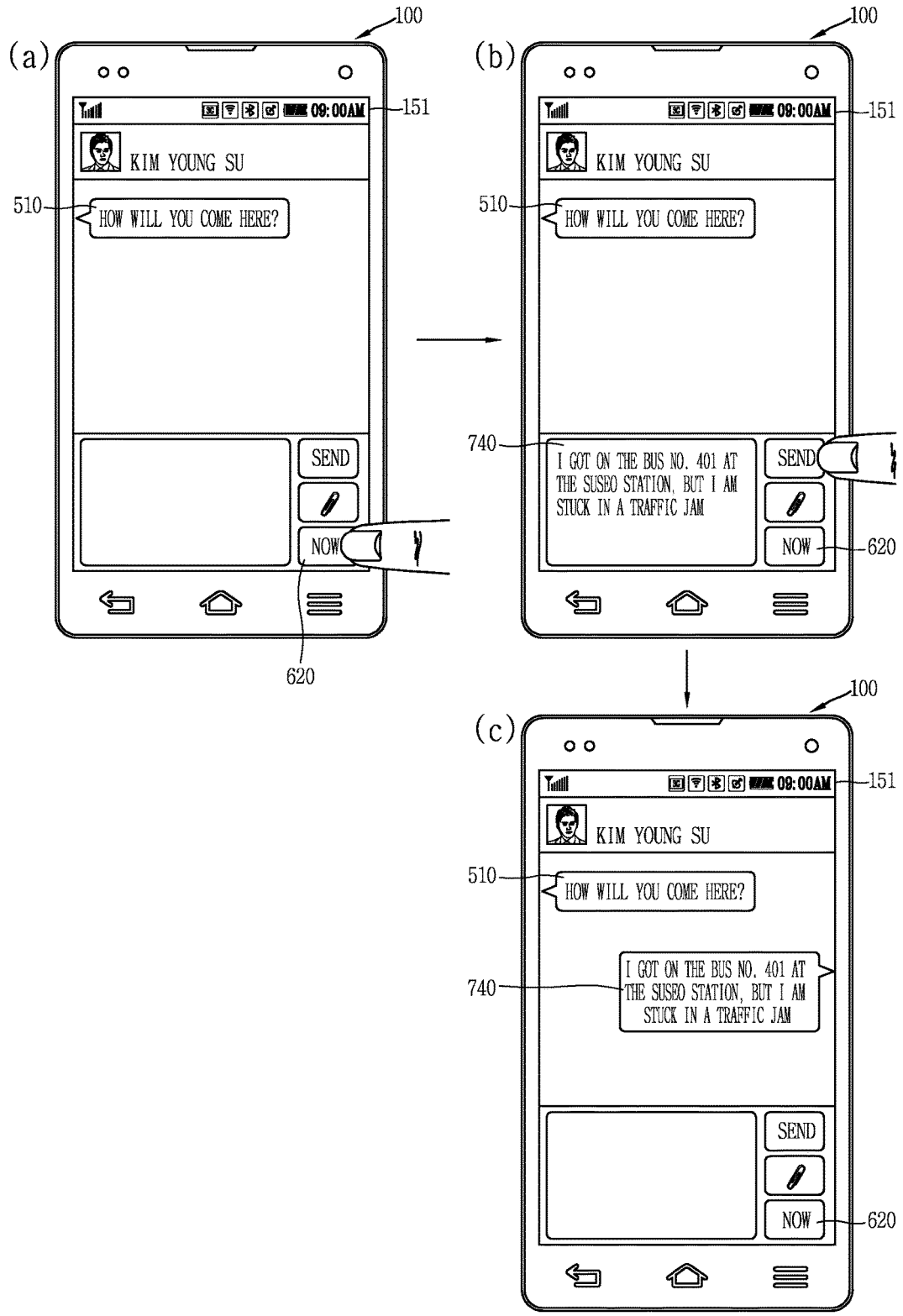

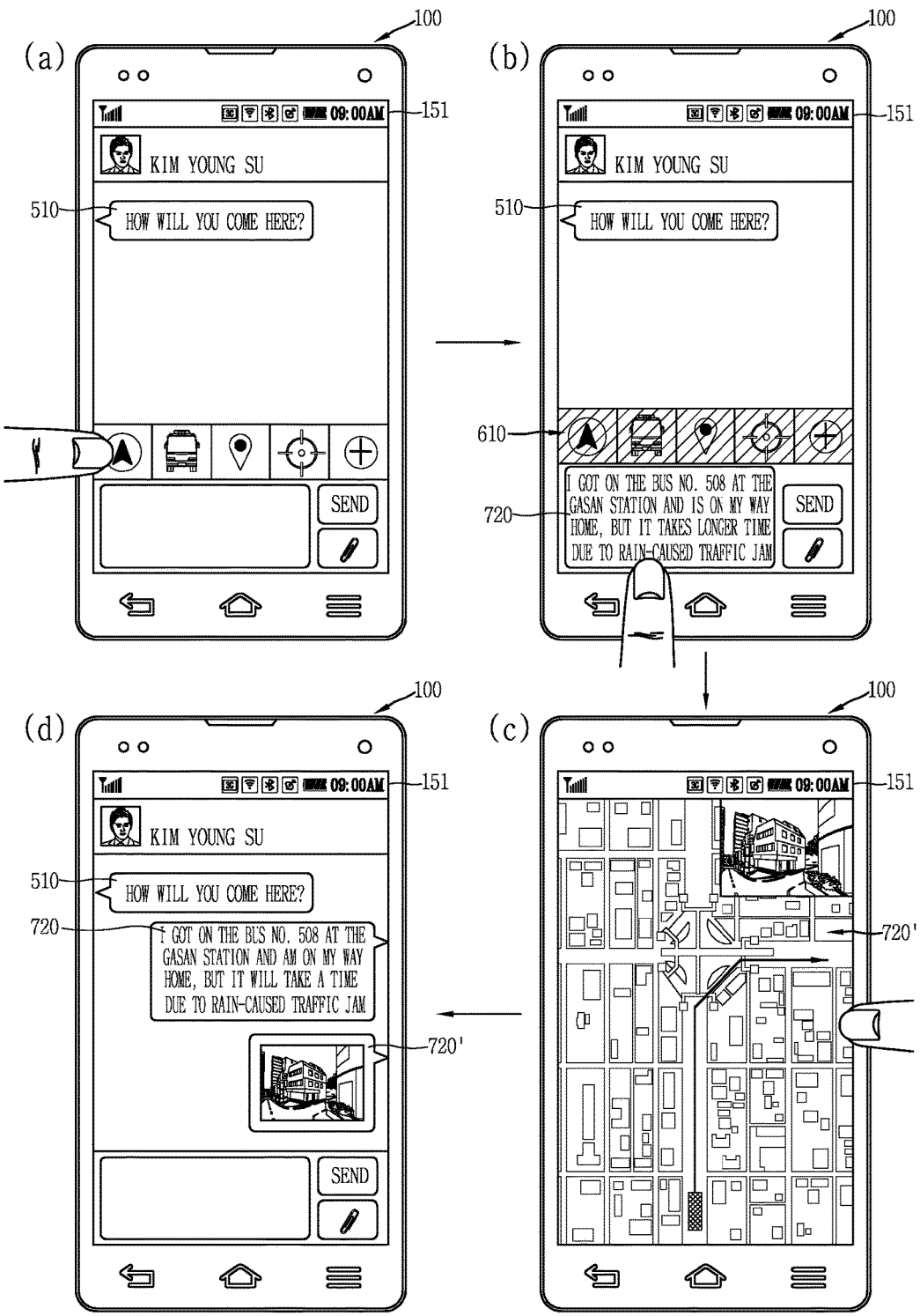

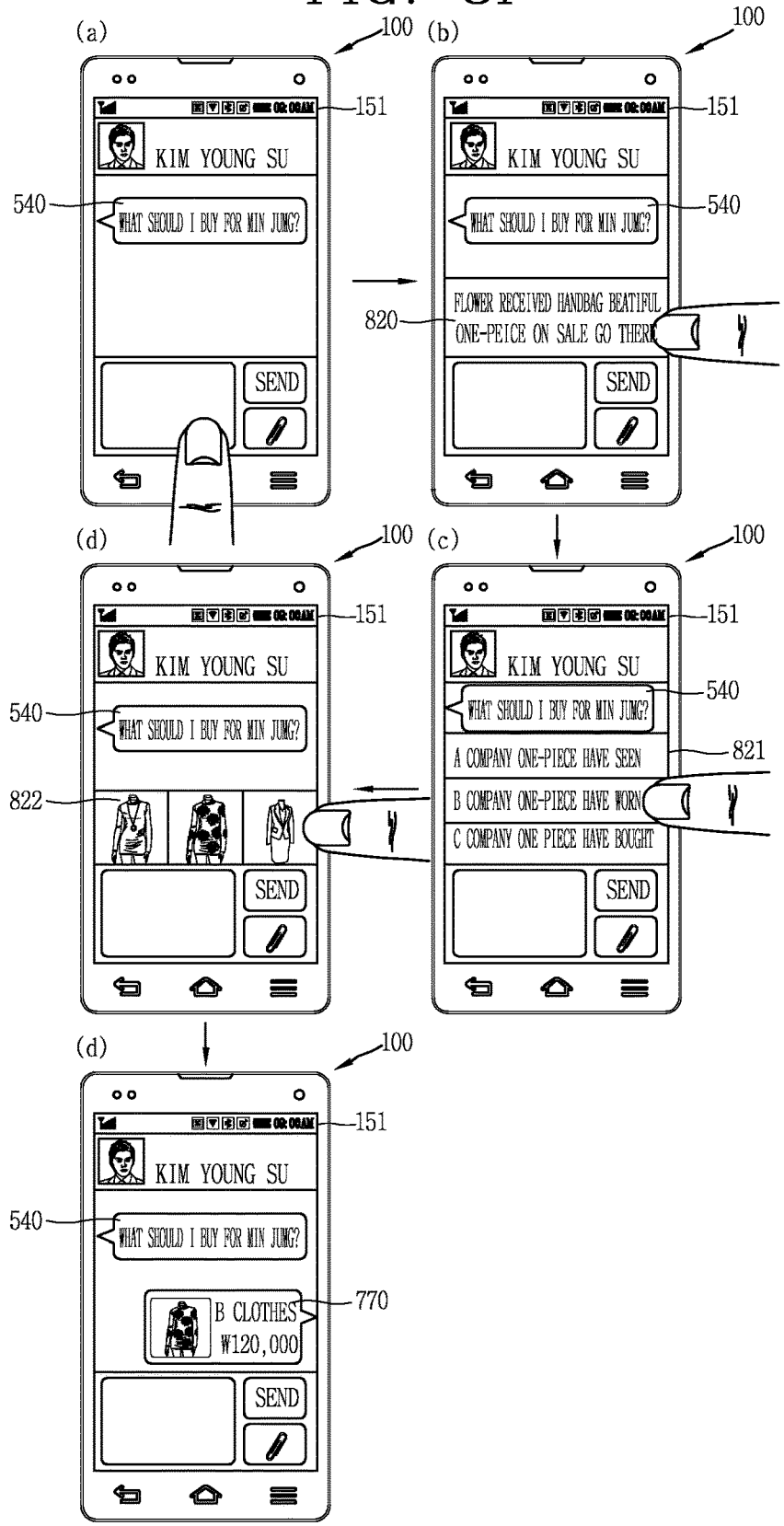

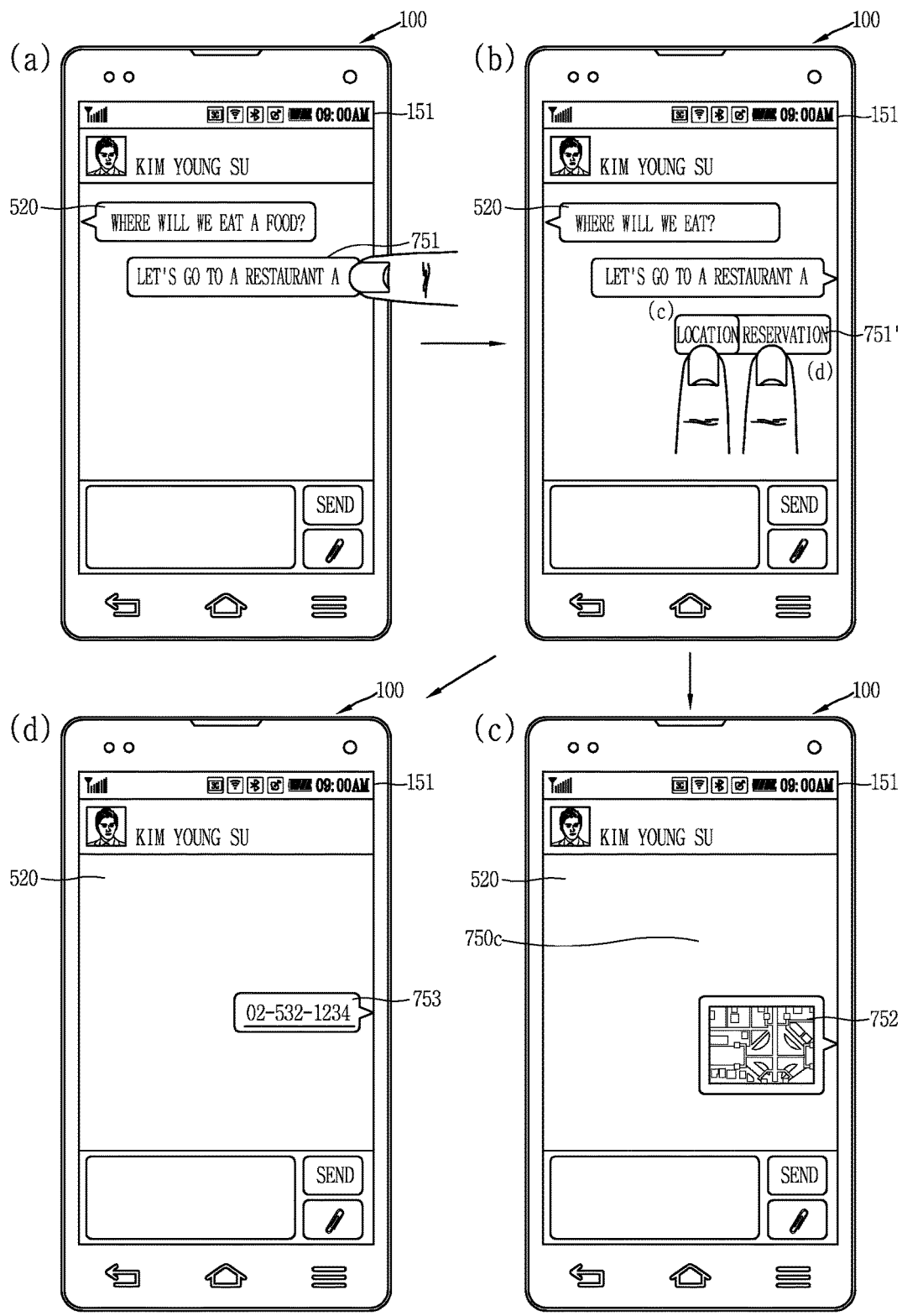

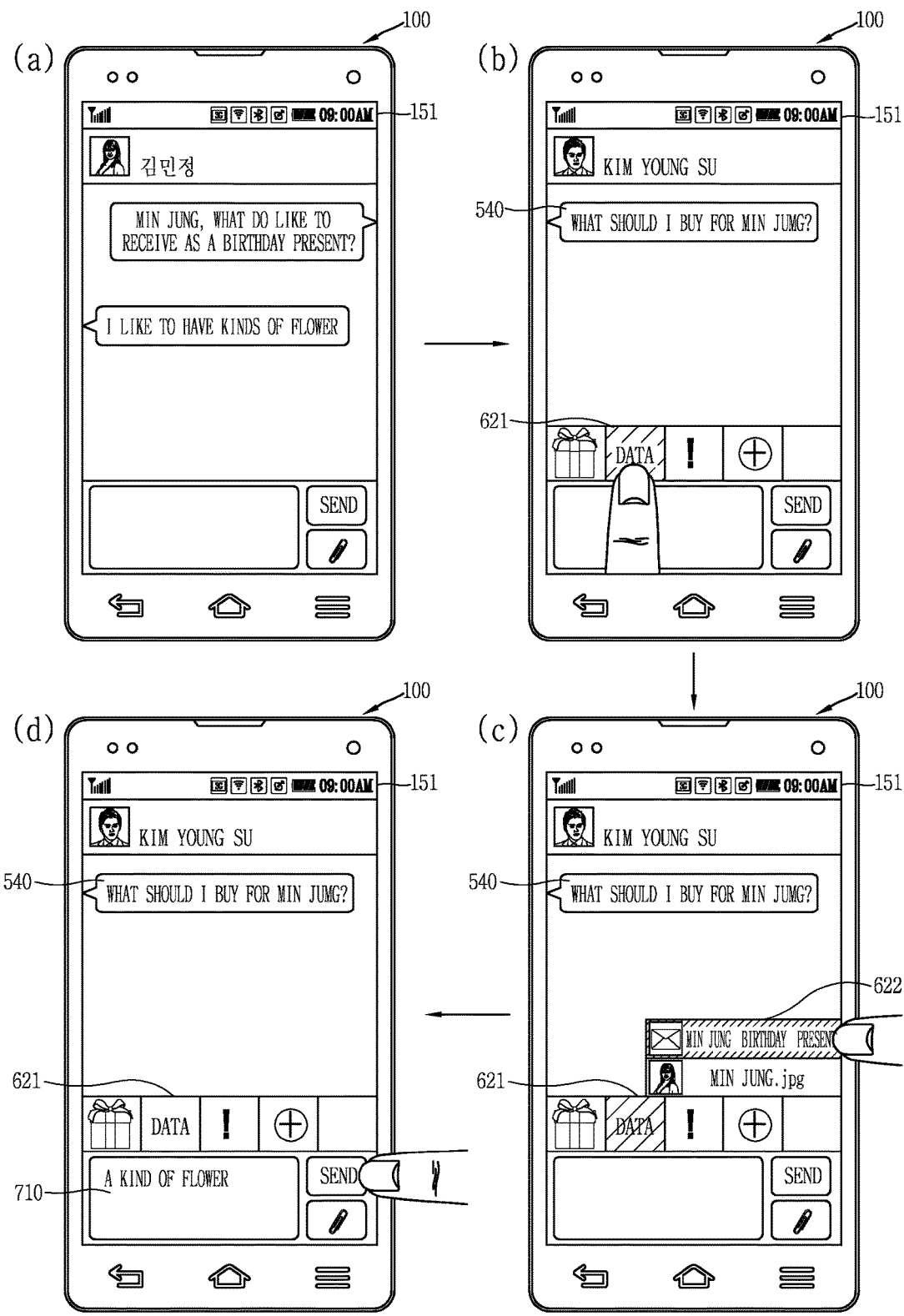

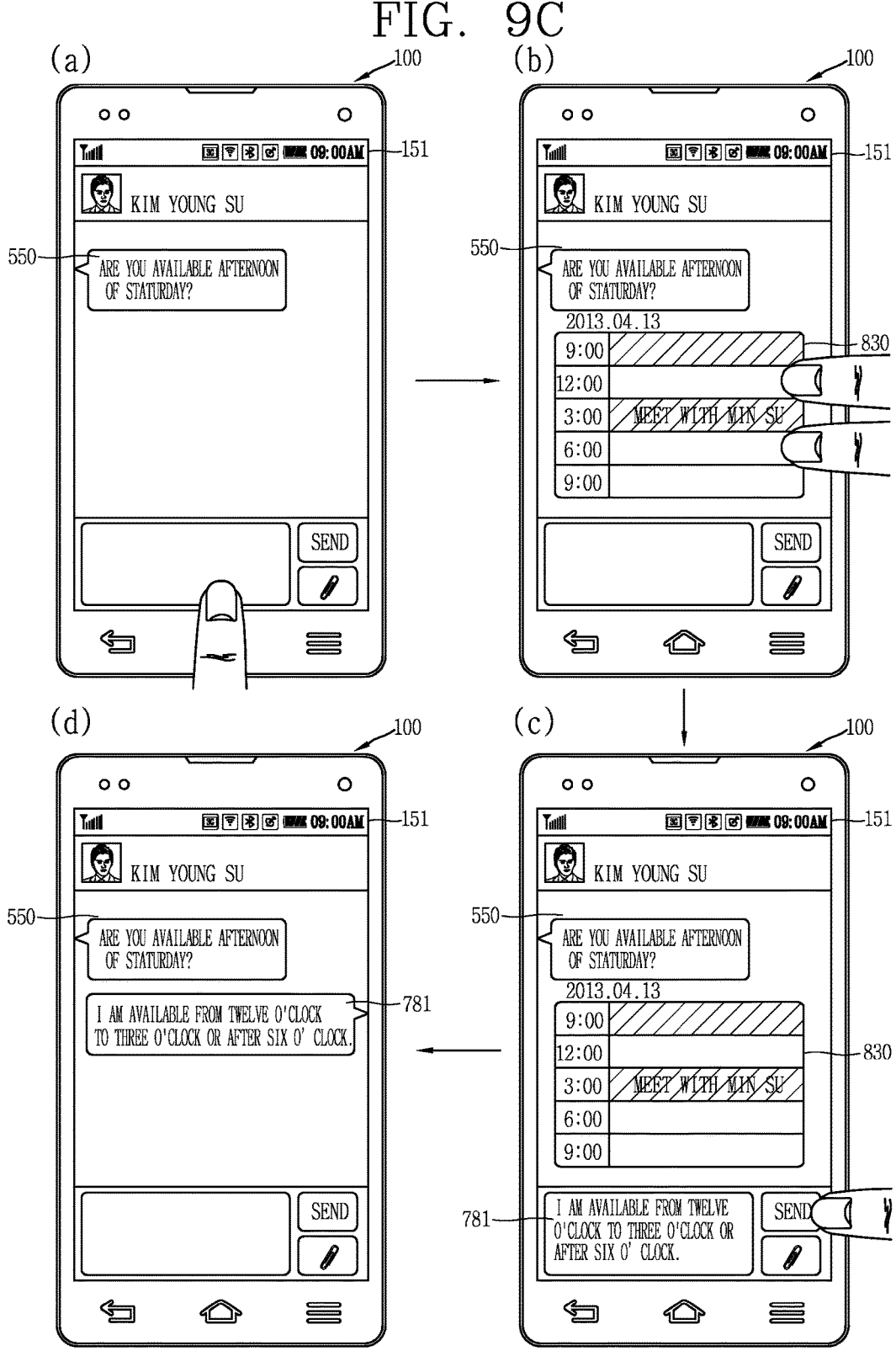

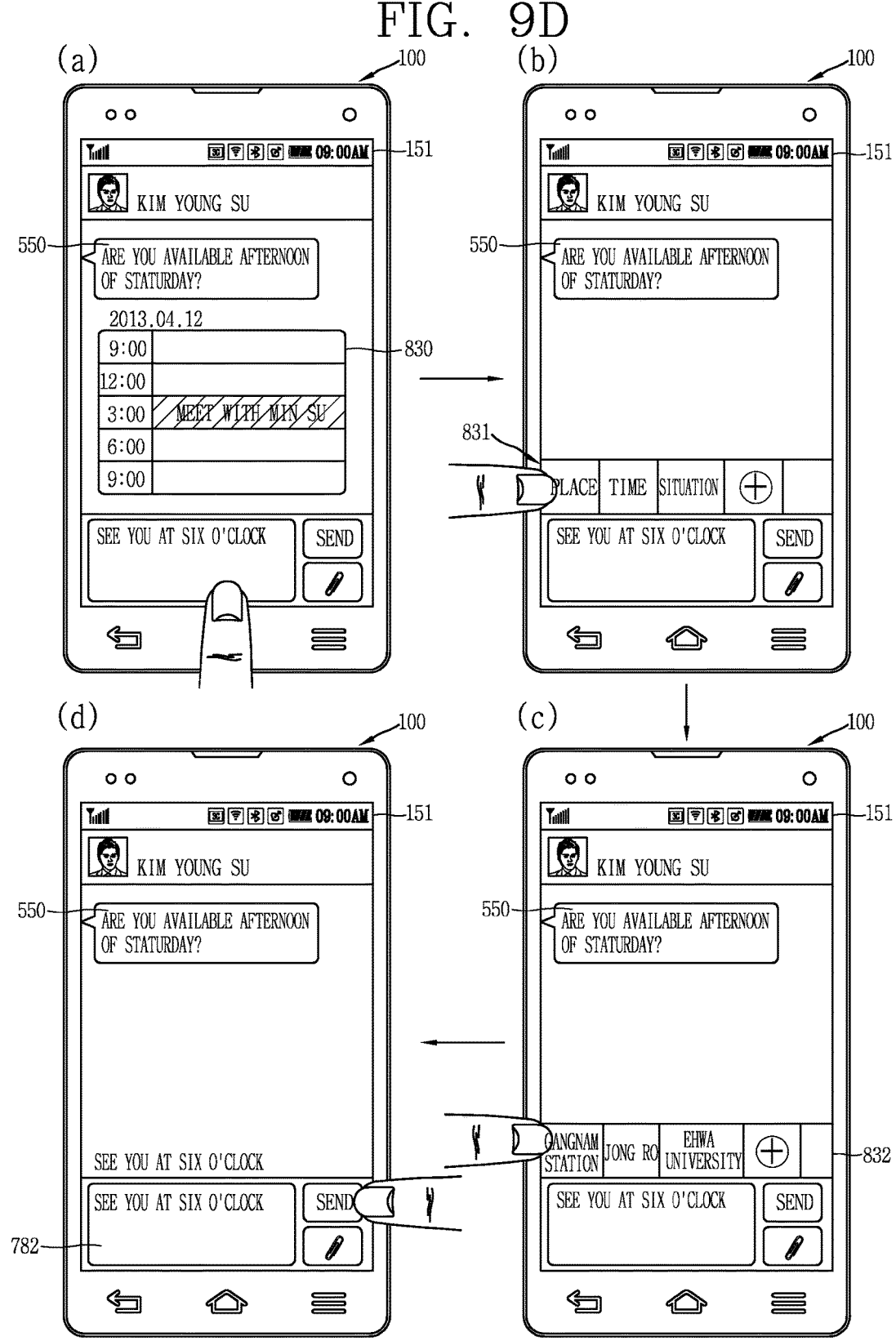

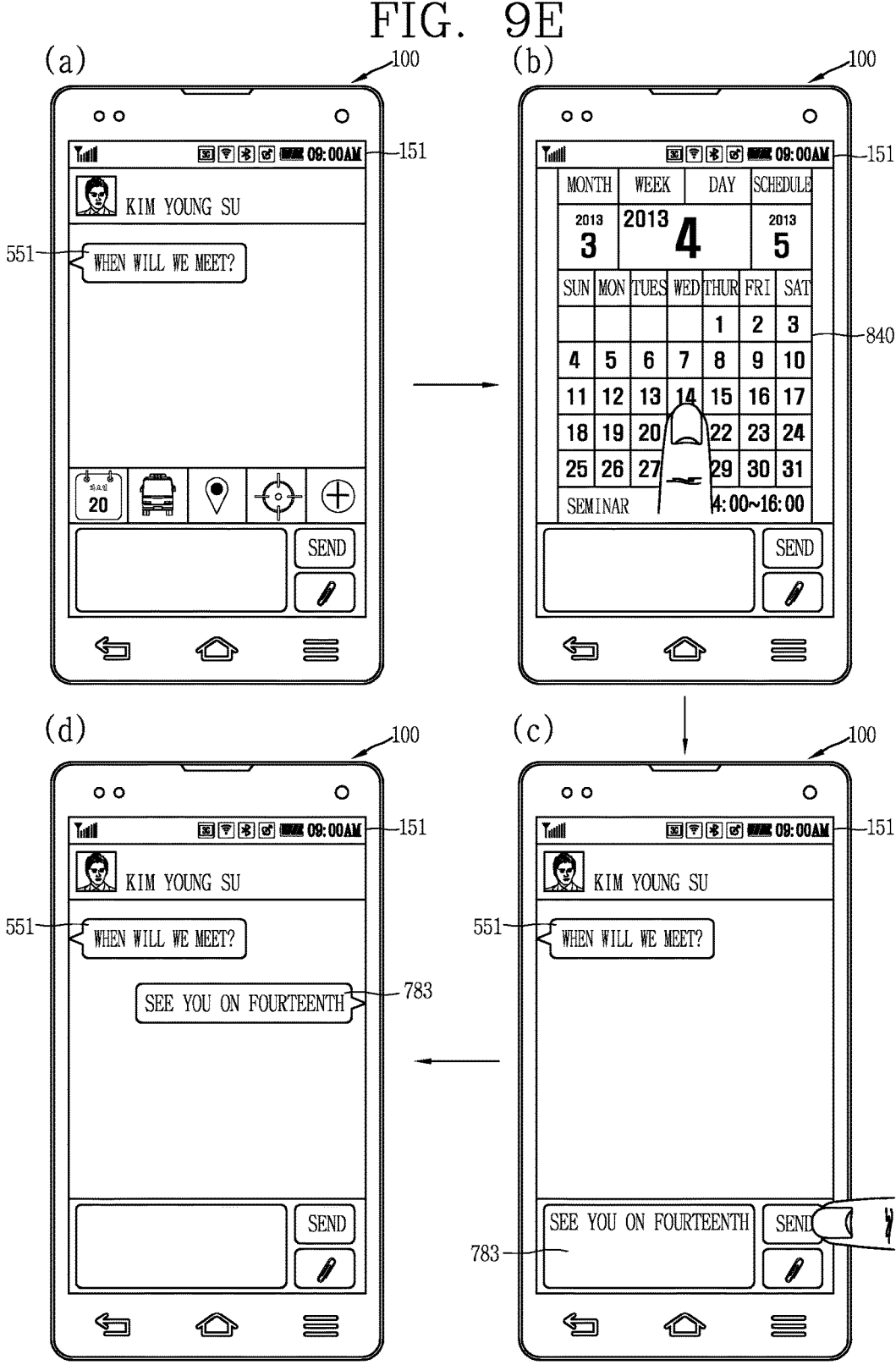

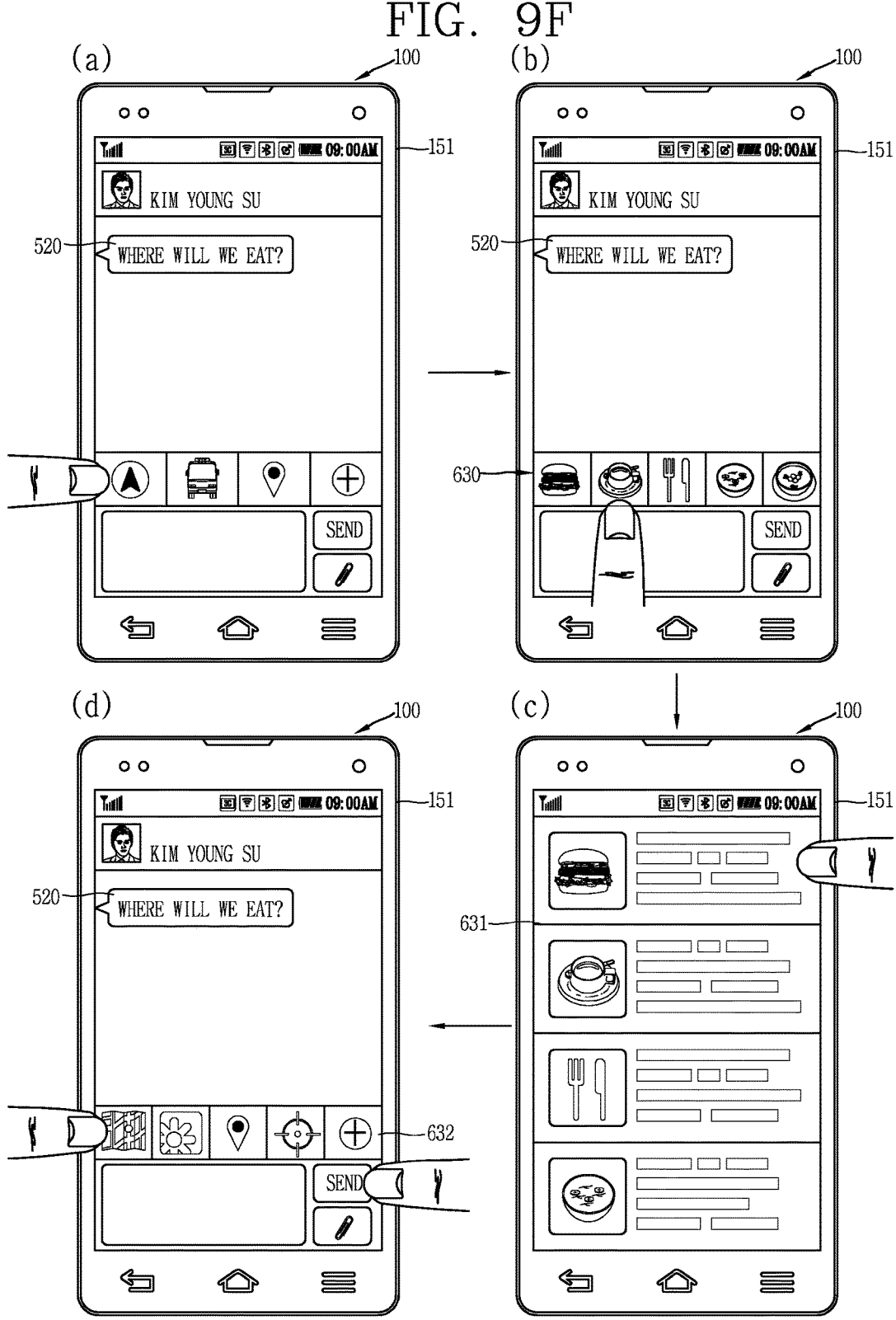

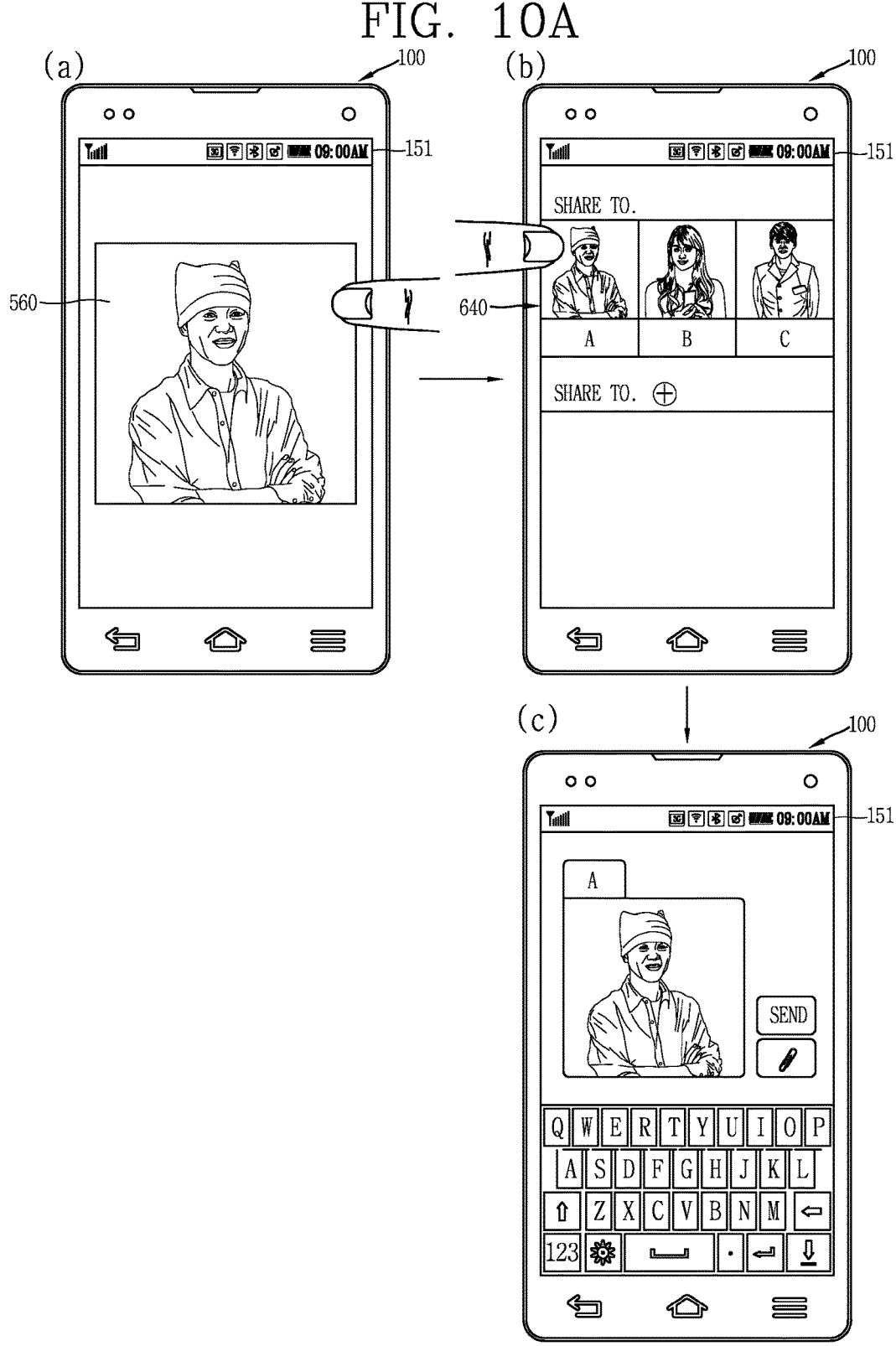

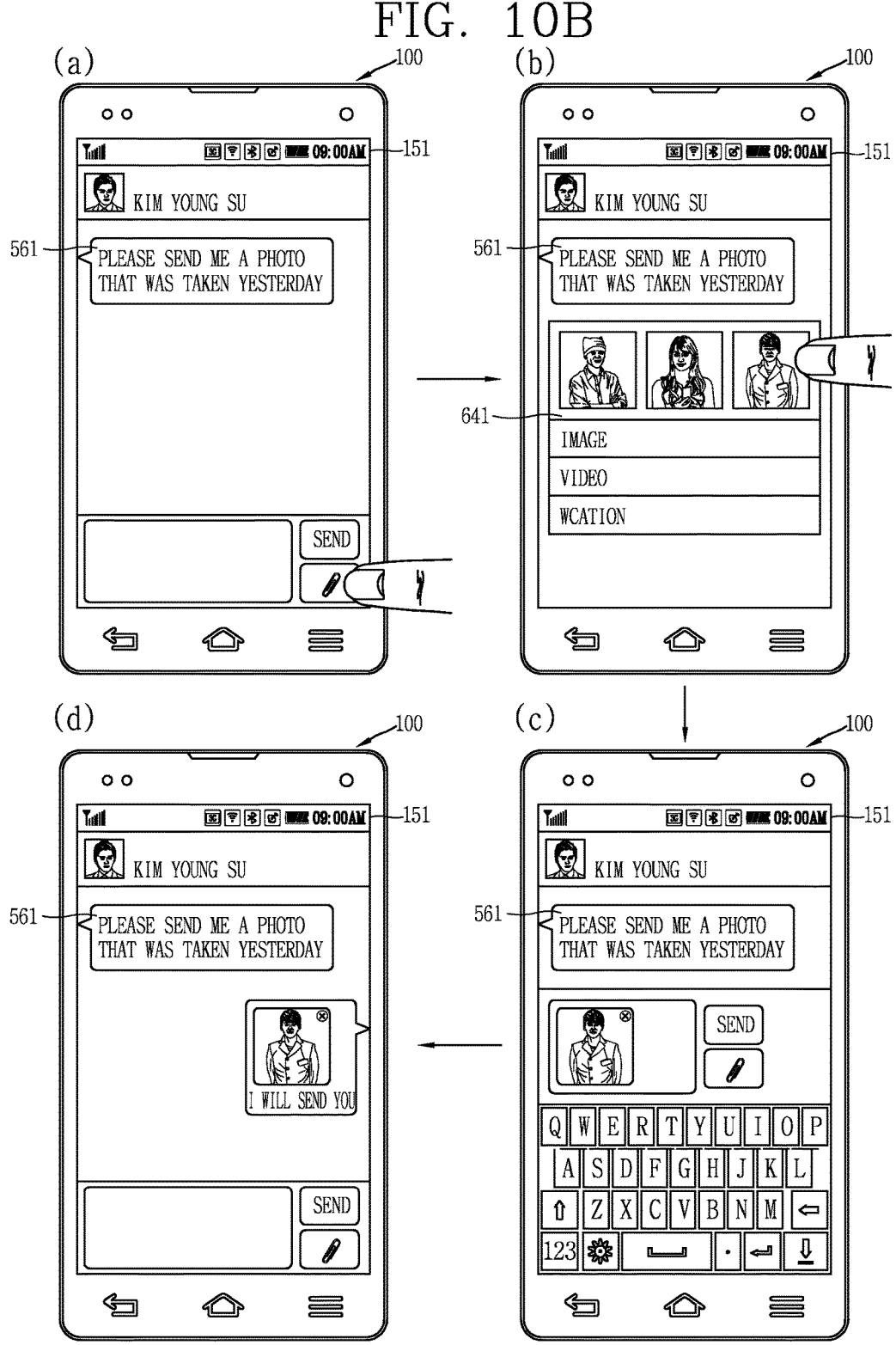

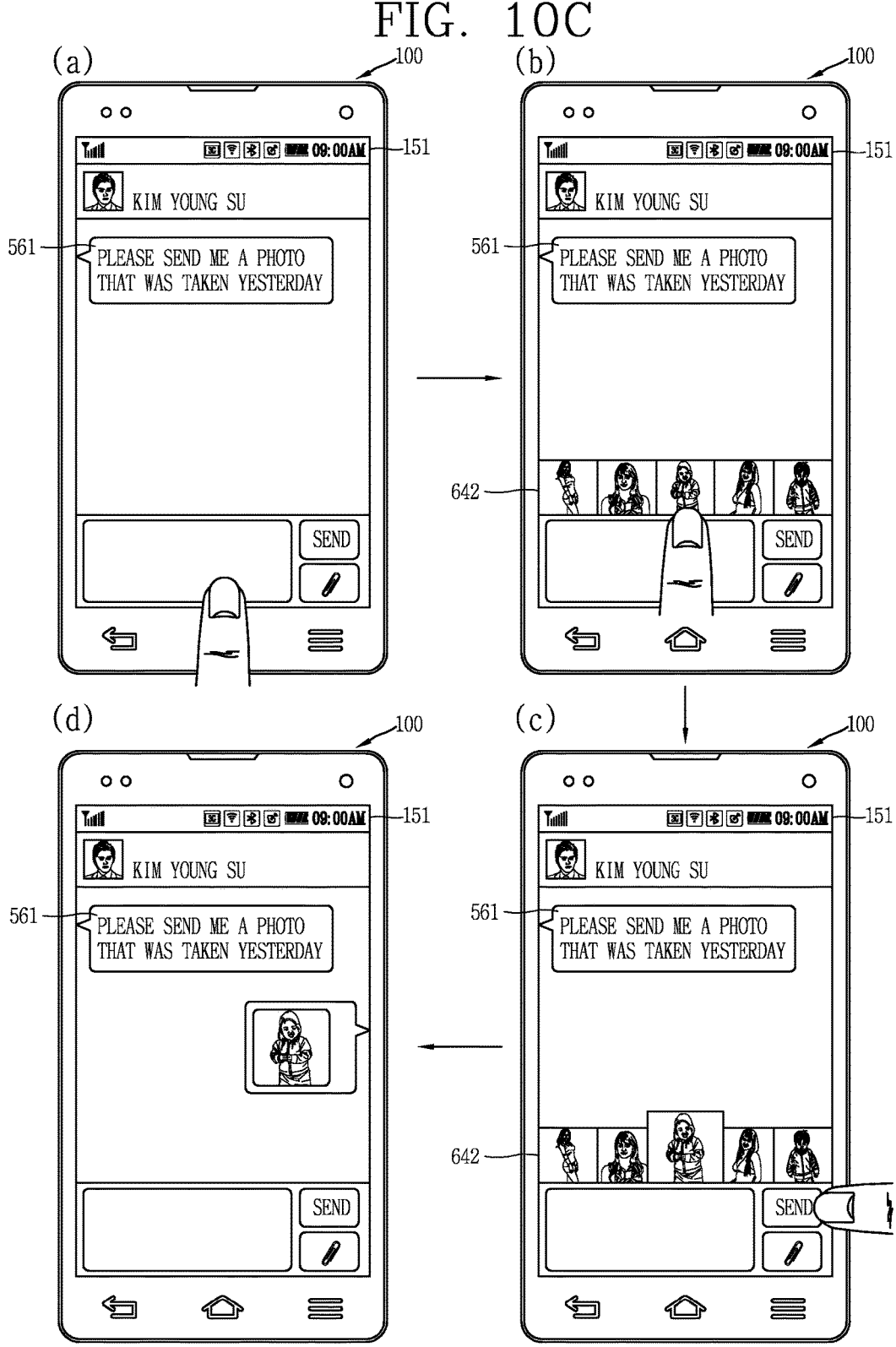

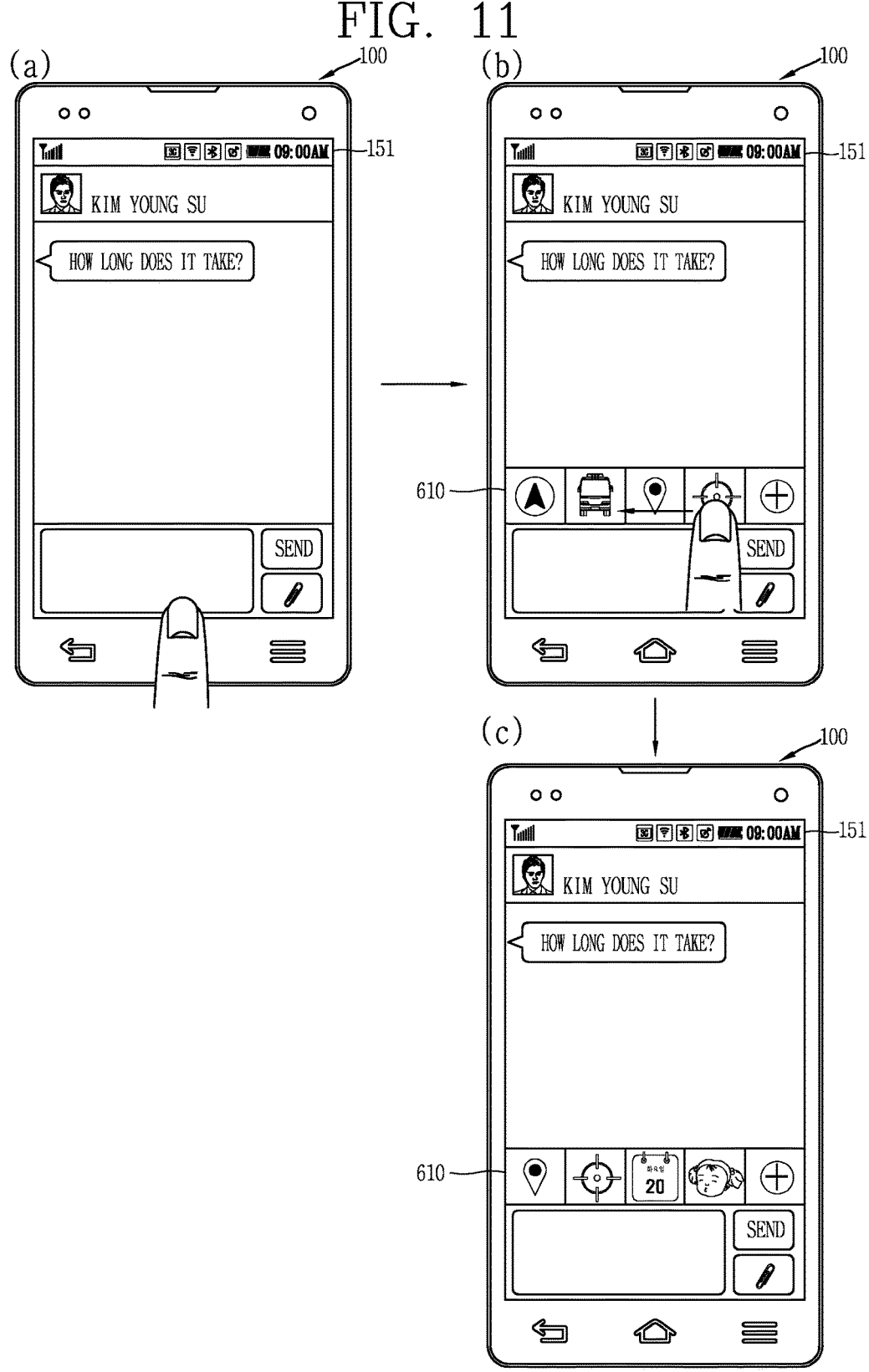

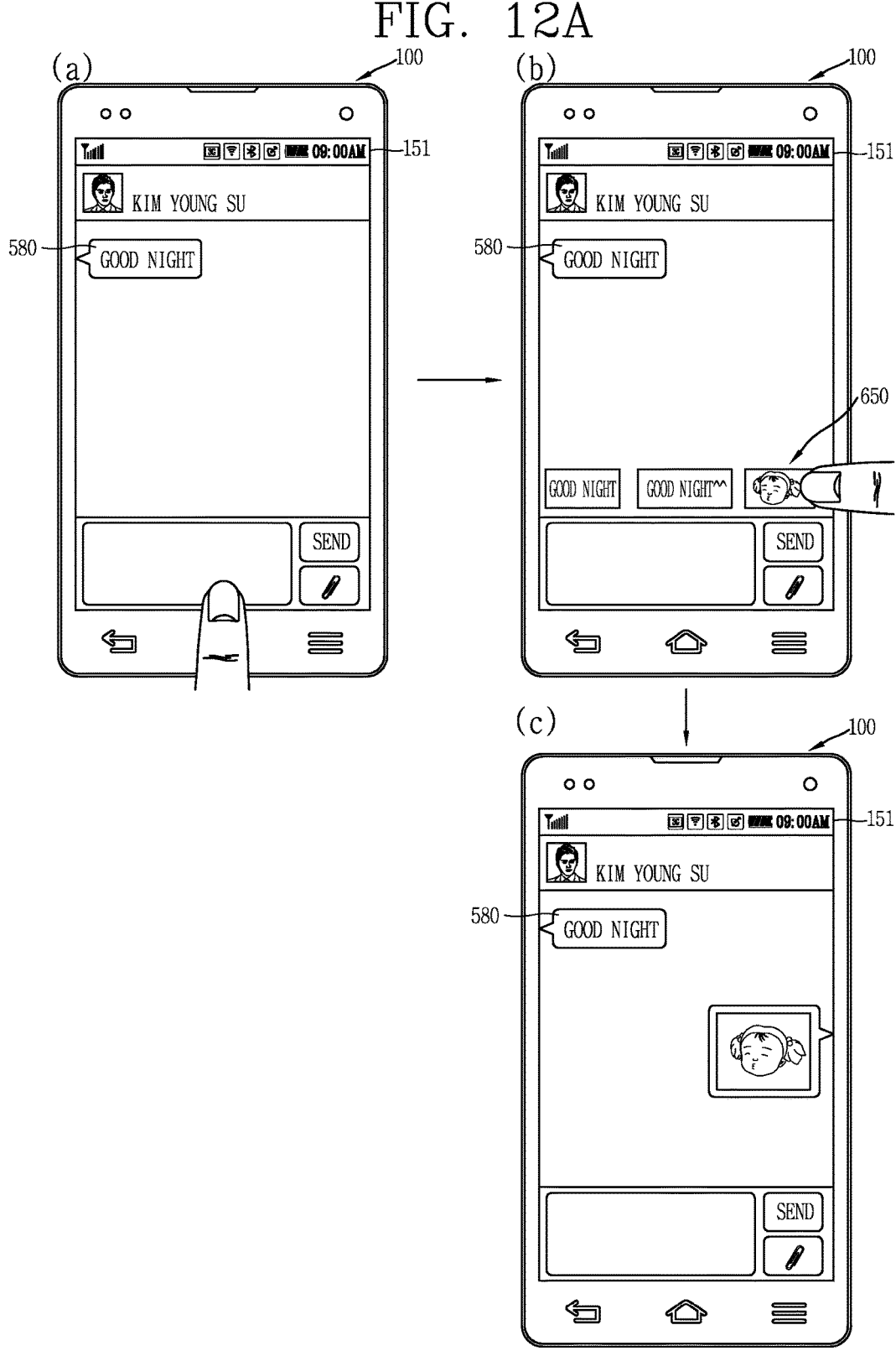

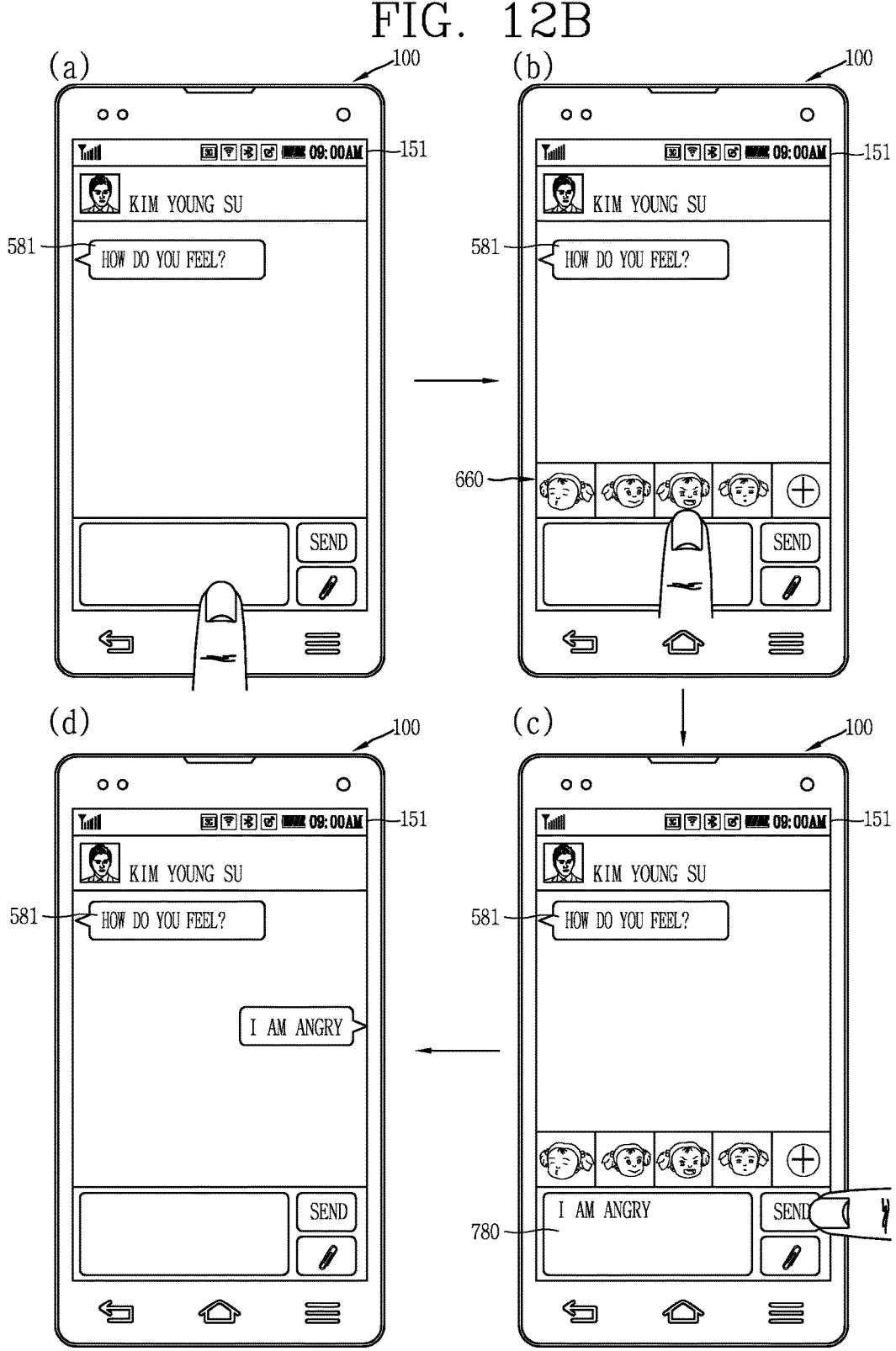

MOBILE TERMINAL AND METHOD OF CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2013-0056663, filed on May 20, 2013, the contents of which is incorporated by reference herein in its entirety.

BACKGROUND OF THE INVENTION

1. Field of the Invention

The present invention relates to a mobile terminal including a display unit in which information is input by applying a touch input.

2. Background of the Invention

A terminal is broadly categorized by mobility into a mobile terminal and a stationary terminal. The mobile terminal is further categorized by portability into a handheld terminal and a vehicle-mounted terminal.

In response to an increasing demand for diversified functions, the terminal functions as a multimedia player with multiple functions such as shooting a photographic object as a still image or moving images, reproducing digital audio and video compression files, playing a game, receiving a broadcast or the like. Furthermore, structural and software modifications to the mobile terminal are considered for supporting and improving functions of the mobile terminal.

In recent years, functions have been realized that enable a user to input information by applying a touch input to a display unit and store the information as various types such as an image, text, or the like.

The user can input data related to content, such as when a response is made to a text message that is received from an external terminal. However, there is inconvenience in that the same data is repeatedly input due to a user's usage pattern of the mobile terminal, in which case similar data has to be input repeatedly.

SUMMARY OF THE INVENTION

Therefore, an aspect of the detailed description is to provide a mobile terminal equipped with a display unit in which information is conveniently input by applying a touch input.

To achieve these and other advantages and in accordance with the purpose of this specification, as embodied and broadly described herein, there is provided a mobile terminal including a display unit to which content is output, an analysis unit that analyzes constituent units that make up the content, and a controller that outputs an icon corresponding to the constituent unit of the content, and controls the display unit in such a manner that text related to the content is output, based on a touch input that is applied to the icon.

In the mobile terminal, the content may include at least one semantic component, and when the touch input is applied to the icon, the controller may output text related to the semantic component.

The mobile terminal may further include a wireless communication unit that receives the content from an external terminal, and a memory in which data that is transmitted to and received from the external terminal is stored, in which the controller extracts the text related to the content from the data.

In the mobile terminal, the icon may include multiple graphic images, each including different information, and the controller may generate constituent elements that make up the text, based on the touch input that is applied to the graphic image, and may control the display unit in such a manner that the generated constituent elements are output.

In the mobile terminal, the graphic image may include multiple pieces of information, and the controller may output the multiple pieces of information, based on the touch input that is applied to the graphic image and may control the display unit in such a manner that among the multiple pieces of information, at least one piece of information is output as text.

In the mobile terminal, the controller may execute a function of searching for information related to the content, based on the touch input that is applied to the graphic image, and may control the display unit in such a manner that the searched-for information is output.

In the mobile terminal, the icon may include an information window including information that is to be searched for, and the controller may control the display unit in such a manner that among the information that is to be searched for and the searched-for information, at least at least one piece of information is output.

In the mobile terminal, the controller may search for a current status of the mobile terminal, based on the touch input that is applied to the information window and may control the display unit in such a manner that the searched-for current status is output.

The mobile terminal may further include a memory in which data that is received from the external terminal or is input by a user, in which the controller may extract information from the memory, based on the touch input that is applied to the information window.

In the mobile terminal, the controller may control the display unit in such a manner that an execution screen of an application that includes information related to content is output, and may control the display unit in such a manner that the text is output based on the touch input that is applied to the execution screen.

In the mobile terminal, the controller may control the display unit in such a manner that an arrangement of constituent elements, each corresponding to the graphic image, is changed based on a method of arranging the graphic images or based on order of application of the touch input to the graphic image.

In the mobile terminal, the controller may control the display unit in such a manner that an image associated with the text is output, based on the touch input that is applied to the text.

In the mobile terminal, the icon may include the graphic image including different text in the same category, and the different text may correspond to a response to the content.

In the mobile terminal, the different text may be information related to an emotional expression with respect to the content.

In the mobile terminal, a closing constituent unit of the text may be generated based on constituent elements of the content.

In the mobile terminal, the content may include an image, and the controller may control the display unit in such a manner that among an image and text that are related to information corresponding to the image included in the content, at least one is output.

In the mobile terminal, the controller may control the mobile terminal in such a manner that an image including information related to the content is output.

In the mobile terminal, the controller may limit outputting of a constituent element of the text that corresponds to the icon, based on the touch input that is additionally applied to the icon.

To achieve these and other advantages and in accordance with the purpose of this specification, as embodied and broadly described herein, there is provided a method of controlling a mobile terminal, including outputting content to a display unit, analyzing the content, outputting an icon including information corresponding to the content, and outputting the information as text, based on a touch input that is applied to the icon.

In the method, the icon may include multiple graphic images, each corresponding to the constituent element that makes up the text.

According to the present invention, the user can easily input information through the use of the icon that includes each text provided using the content included in the screen information.

In addition, the text is output that is made from one sentence that corresponds to the sentence structure as a result of analyzing the sentence structure of the text. Thus, the text that is more naturally sentence-structured is output.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIGS. 7(a) to 7(c) are diagrams illustrating a control method of outputting text according to another embodiment;

FIGS. 11(a) to 11(c) are diagrams illustrating a control method of providing an icon including multiple graphic images; and FIGS. 12A(a) to 12A(c) and FIGS. 12B(a) to 12B(d) are diagrams for describing a control method of outputting multiple graphic images each of which corresponds to content and is included in the same category.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. A suffix "module" or "unit" used for constituent elements disclosed in the following description is merely intended for easy description of the specification, and the suffix itself does not give any special meaning or function. In describing the present invention, if a detailed explanation for a related known function or construction is considered to unnecessarily divert the gist of the present disclosure, such explanation has been omitted but would be understood by those skilled in the art. The accompanying drawings are used to help easily understood the technical idea of the present invention and it should be understood that the idea of the present disclosure is not limited by the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC and an ultra book. However, it will be obvious to those skilled in the art that the present invention may be also applicable to a fixed terminal such as a digital TV and a desktop computer, except for specific configurations for mobility.

Figure 1:
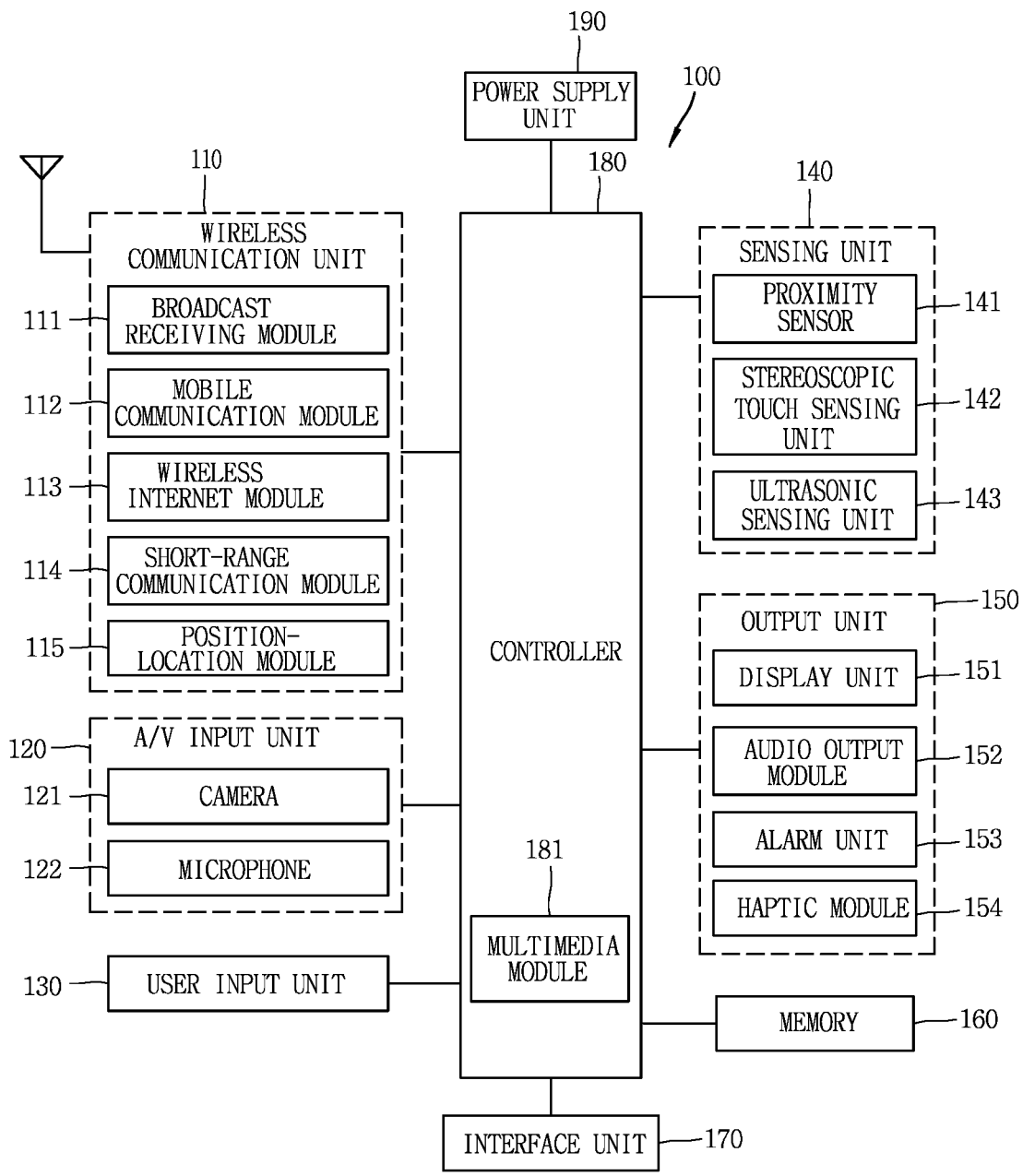
FIG. 1 is a block diagram illustrating a mobile terminal according to one embodiment described in the present disclosure.

FIG. 1 is a block diagram of a mobile terminal 100 in accordance with one exemplary embodiment. The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but implementing all of the illustrated components is not a requirement. Greater or fewer components may alternatively be implemented.

Hereinafter, each component is described in sequence. The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the display device. The broadcast signal may be implemented as a TV broadcast signal, a radio broadcast signal, and a data broadcast signal, among others. The broadcast signal may further include a data broadcast signal combined with a TV or radio broadcast signal.

Examples of broadcast associated information include information associated with a broadcast channel, a broadcast program, a broadcast service provider, and the like. The broadcast associated information may be provided via a mobile communication network, and received by the mobile communication module 112.

The broadcast associated information can be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external display device, a server, etc.) on a mobile communication network. Here, the wireless signals may include audio call signal, video (telephony) call signal, or various formats of data according to transmission/reception of text/multimedia messages.

The mobile communication module 112 may implement a video call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 supports wireless Internet access for the display device. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, Near Field Communication (NFC) and the like.

The location information module 115 denotes a module for detecting or calculating a position of a display device. An example of the location information module 115 may include a Global Position System (GPS) module.

Still referring to FIG. 1, the A/V input unit 120 is configured to provide audio or video signal input to the display device. The A/V input unit 120 may include a camera 121 and a microphone 122. The camera 121 receives and processes image frames of still pictures or video obtained by image sensors in a video call mode or a capturing mode. The processed image frames may be displayed on a display unit 151.

The image frames processed by the camera 121 may be stored in the memory 160 or transmitted to the exterior via the wireless communication unit 110. Also, user's position information and the like may be calculated from the image frames acquired by the camera 121. Two or more cameras 121 may be provided according to the configuration of the display device.

The microphone 122 may receive an external audio signal while the display device is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the display device. The user input unit 130 may include a keypad, a dome switch, a touchpad (e.g., static pressure/capacitance), a jog wheel, a jog switch and the like.

The sensing unit 140 provides status measurements of various aspects of the display device. For instance, the sensing unit 140 may detect an open/close status of the display device, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type display device, the sensing unit 140 may sense whether a sliding portion of the display device is open or closed. Other examples include sensing functions, such as the sensing unit 140 sensing the presence or absence of power provided by the power supply 190, the presence or absence of a coupling or other connection between the interface unit 170 and an external device.

The output unit 150 is configured to output an audio signal, a video signal or a tactile signal. The output unit 150 may include a display unit 151, an audio output module 152, an alarm unit 153 and a haptic module 154.

The display unit 151 may output information processed in the mobile terminal 100. For example, when the display device is operating in a phone call mode, the display unit 151 will provide a User Interface (UI) or a Graphic User Interface (GUI), which includes information associated with the call. As another example, if the display device is in a video call mode or a capturing mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of such displays 151 may be implemented as a transparent type or an optical transparent type through which the exterior is visible, which is referred to as 'transparent display'. A representative example of the transparent display may include a Transparent OLED (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the displays 151 may be arranged on one surface to be spaced apart from or integrated with each other, or may be arranged on different surfaces.

The display unit 151 may also be implemented as a stereoscopic display unit for displaying stereoscopic images.

Here, the stereoscopic image may be a three-dimensional (3D) stereoscopic image, and the 3D stereoscopic image is an image refers to an image making a viewer feel that a gradual depth and reality of an object on a monitor or a screen is the same as a reality space. A 3D stereoscopic image is implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, include Wheatstone stereoscopic scheme, or the like.

The auto-stereoscopic scheme includes, for example, a parallax barrier scheme, a lenticular scheme, an integral imaging scheme, or the like. The projection scheme includes a reflective holographic scheme, a transmissive holographic scheme, or the like.

In general, a 3D stereoscopic image includes a left image (a left eye image) and a right image (a right eye image). According to how left and right images are combined into a 3D stereoscopic image, the 3D stereoscopic imaging method is divided into a top-down method in which left and right images are disposed up and down in a frame, an L-to-R (left-to-right, side by side) method in which left and right images are disposed left and right in a frame, a checker board method in which fragments of left and right images are disposed in a tile form, an interlaced method in which left and right images are alternately disposed by columns and rows, and a time sequential (or frame by frame) method in which left and right images are alternately displayed by time.

Also, as for a 3D thumbnail image, a left image thumbnail and a right image thumbnail are generated from a left image and a right image of the original image frame, respectively, and then combined to generate a single 3D thumbnail image. In general, thumbnail refers to a reduced image or a reduced still image. The thusly generated left image thumbnail and the right image thumbnail are displayed with a horizontal distance difference therebetween by a depth corresponding to the disparity between the left image and the right image on the screen, providing a stereoscopic space sense.

A left image and a right image required for implementing a 3D stereoscopic image is displayed on the stereoscopic display unit by a stereoscopic processing unit. The stereoscopic processing unit may receive the 3D image and extract the left image and the right image, or may receive the 2D image and change it into a left image and a right image.

Here, if the display unit 151 and a touch sensitive sensor (referred to as a touch sensor) have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

Still referring to FIG. 1, a proximity sensor 141 may be arranged at an inner region of the mobile terminal 100 covered by the touch screen, or near the touch screen. The proximity sensor 141 may be provided as one example of the sensing unit 140. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 detects the distance between a sensing object (e.g., the user's finger or a stylus pen) applying a touch by using the force of electromagnetism or infrared rays without a mechanical contact and a detect surface. By using the distance, the terminal recognizes which portion of a stereoscopic image has been touched. In particular, when the touch screen is an electrostatic touch screen, the degree of proximity of the sensing object is detected based on a change of an electric field according to proximity of the sensing object, and a touch to the 3D image is recognized by using the degree of proximity.

The stereoscopic touch sensing unit 142 is configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 is configured to recognize position information of the sensing object by using ultrasonic waves. The ultrasonic sensing unit 143 may include, for example, an optical sensor and a plurality of ultrasonic sensors. The optical sensor is configured to sense light and the ultrasonic sensors may be configured to sense ultrasonic waves. Since light is much faster than ultrasonic waves, a time for which the light reaches the optical sensor is much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 includes at least one of a camera 121, a photo sensor, and a laser sensor. For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor is configured to scan a movement of the sensing object in proximity to the touch screen. In detail, the photo sensor includes photo diodes and transistors at rows and columns to scan content mounted on the photo sensor by using an electrical signal changing according to the quantity of applied light. Namely, the photo sensor calculates the coordinates of the sensing object according to variation of light to thus obtain position information of the sensing object.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a speaker, a buzzer or the like.

The alarm unit 153 outputs a signal for informing about an occurrence of an event of the mobile terminal 100. Events generated in the display device may include call signal reception, message reception, key signal inputs, a touch input etc. In addition to video or audio signals, the alarm unit 153 may output signals in a different manner, for example, using vibration to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the display device therethrough. Various command signals or power inputted from the cradle may operate as signals for recognizing that the display device is properly mounted on the cradle.

The controller 180 typically controls the general operations of the display device. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively. Also, the controller 180 may execute a lock state to restrict a user from inputting control commands for applications when a state of the display device meets a preset condition. Also, the controller 180 may control a lock screen displayed in the lock state based on a touch input sensed on the display unit 151 in the lock state of the display device.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 2A:
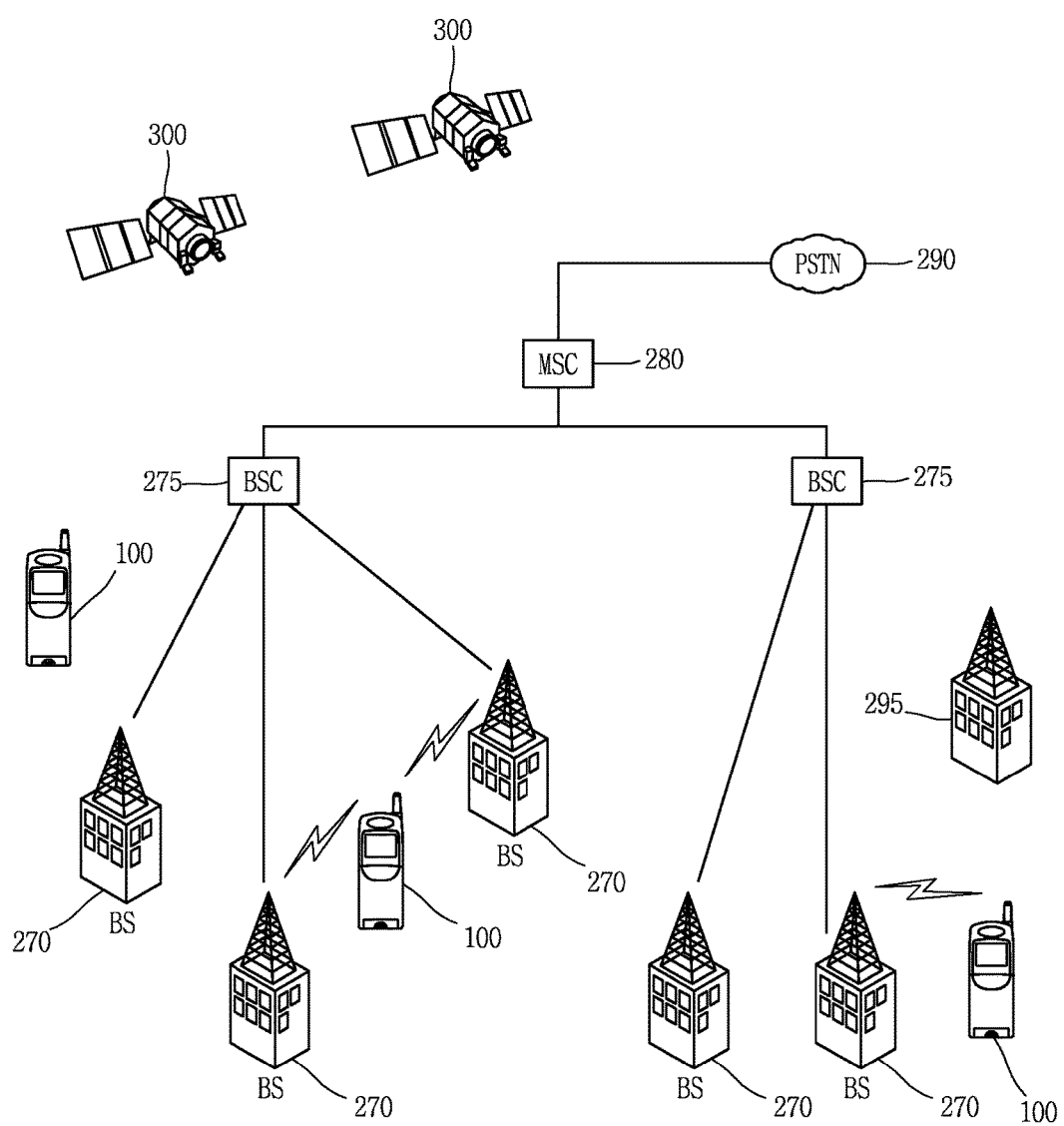
FIG. 2A and FIG. 2B are diagrams, each illustrating a telecommunication system in which the mobile terminal according to the present invention operates.
Figure 2B:
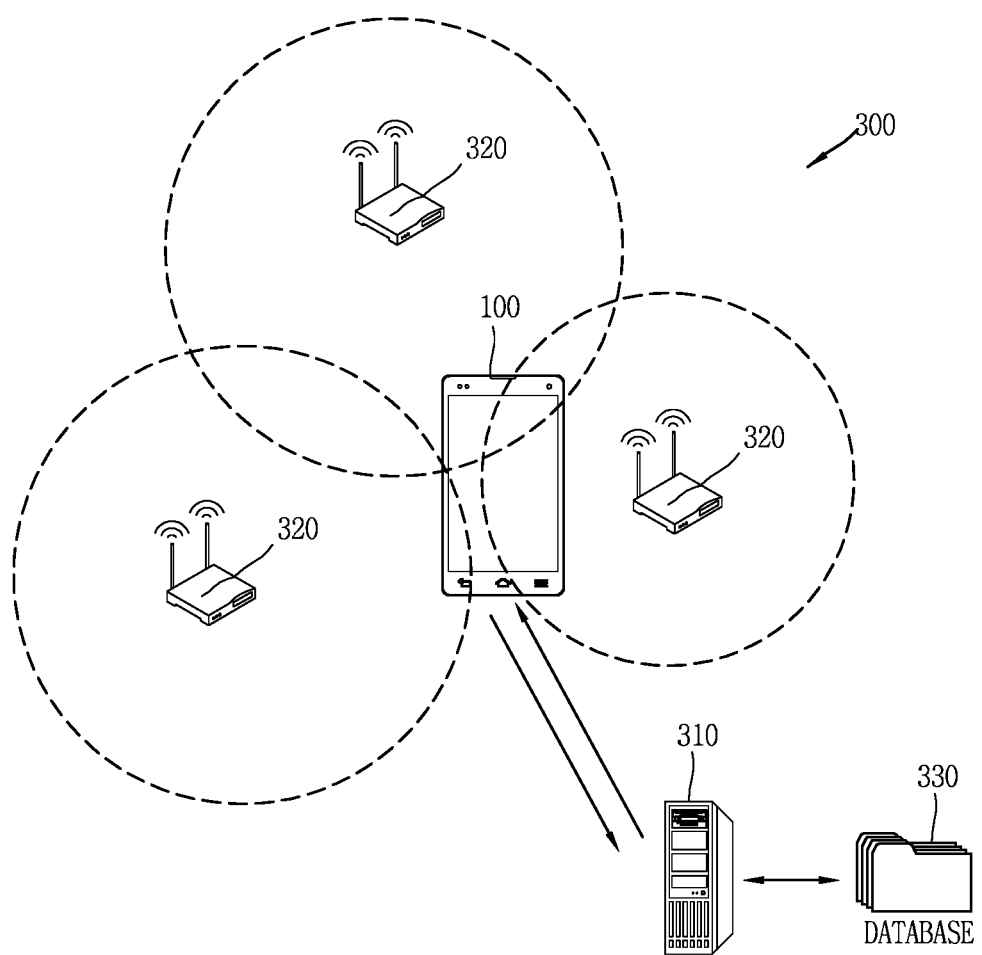

Hereinafter, a communication system which is operable with the mobile terminal 100 according to the present invention will be described. FIGS. 2A and 2B are conceptual views of a communication system operable with a mobile terminal 100 in accordance with the present disclosure.

First, referring to FIG. 2A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 2A, a CDMA wireless communication system is shown having a plurality of display devices 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 2A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

A broadcasting transmitter (BT) 295, as shown in FIG. 2A, transmits a broadcast signal to the display device s 100 operating within the system. The broadcast receiving module 111 (FIG. 1B) is typically configured inside the mobile terminal 100 to receive broadcast signals transmitted by the BT 295.

FIG. 2A further depicts several Global Positioning System (GPS) satellites 300. Such satellites 300 facilitate locating the position of at least one of plural display devices 100. Two satellites are depicted in FIG. 2, but it is understood that useful position information may be obtained with greater or fewer satellites than two satellites. The GPS module is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various display devices 100. The display devices 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the display device s 100.

Hereinafter, description will be given of a method for acquiring location information of a display device using a wireless fidelity (WiFi) positioning system (WPS), with reference to FIG. 2B.

The WiFi positioning system (WPS) 300 refers to a location determination technology based on a wireless local area network (WLAN) using WiFi as a technology for tracking the location of the mobile terminal 100 using a WiFi module provided in the mobile terminal 100 and a wireless access point 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 extracts the information of the wireless AP 320 connected to the mobile terminal 100 based on a location information request message (or signal) of the mobile terminal 100. The information of the wireless AP 320 may be transmitted to the WiFi location determination server 310 through the mobile terminal 100 or transmitted to the WiFi location determination server 310 from the wireless AP 320.

The information of the wireless AP extracted based on the location information request message of the mobile terminal 100 may be at least one of MAC address, SSID, RSSI, channel information, privacy, network type, signal strength and noise strength.

The WiFi location determination server 310 receives the information of the wireless AP 320 connected to the mobile terminal 100 as described above, and compares the received wireless AP 320 information with information contained in the pre-established database 330 to extract (or analyze) the location information of the mobile terminal 100.

On the other hand, referring to FIG. 2B, as an example, the wireless AP connected to the mobile terminal 100 is illustrated as a first, a second, and a third wireless AP 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information of any wireless APs disposed at different locations may be stored in the database 330. The information of any wireless APs stored in the database 330 may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In this manner, any wireless AP information and location information corresponding to the any wireless AP are stored together in the database 330, and thus the WiFi location determination server 310 may retrieve wireless AP information corresponding to the information of the wireless AP 320 connected to the mobile terminal 100 from the database 330 to extract the location information matched to the searched wireless AP, thereby extracting the location information of the mobile terminal 100.

Furthermore, the extracted location information of the mobile terminal 100 may be transmitted to the mobile terminal 100 through the WiFi location determination server 310, thereby acquiring the location information of the mobile terminal 100.

Figure 3A:
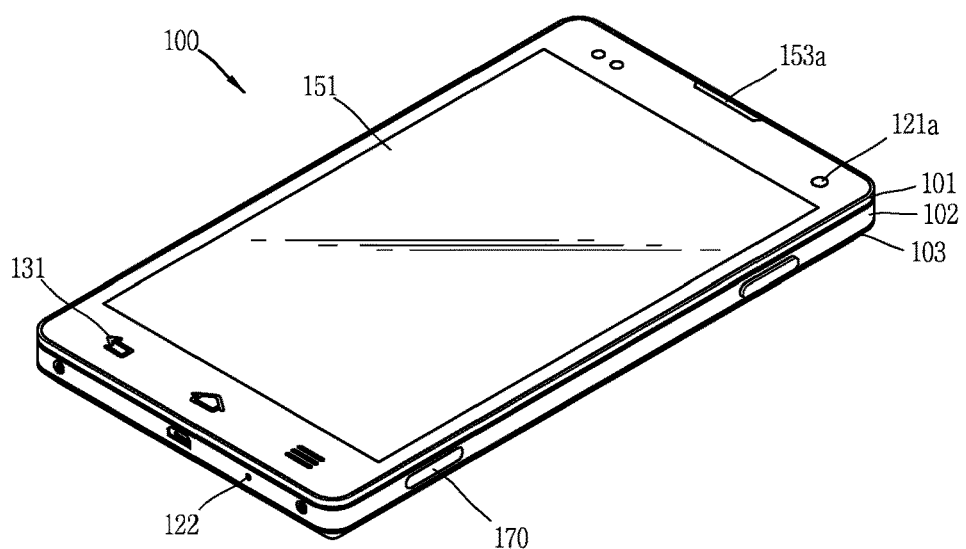
FIG. 3A is a perspective diagram illustrating the mobile terminal according to one embodiment of the present invention when viewed from the front.

FIG. 3A is a front perspective view illustrating an example of the mobile terminal 100 associated with the present disclosure. The mobile terminal 100 disclosed herein is provided with a bar-type terminal body. However, the present invention is not limited to this, but is also applicable to various structures such as watch type, clip type, glasses type or folder type, flip type, swing type, swivel type, or the like, in which two and more bodies are combined with each other in a relatively movable manner.

The body includes a case (casing, housing, cover, etc.) forming the appearance of the terminal. In this embodiment, the case may be divided into a front case 101 and a rear case 102. Various electronic components is incorporated into a space formed between the front case 101 and the rear case 102. At least one middle case may be additionally disposed between the front case 101 and the rear case 102, and a battery cover 103 for covering the battery 191 may be detachably configured at the rear case 102. The cases may be formed by injection-molding a synthetic resin or may be also formed of a metal, for example, stainless steel (STS), titanium (Ti), or the like.

A display unit 151, a first audio output module 153a, a first camera 121a, a first manipulating unit 131 and the like may be disposed on a front surface of the terminal body, and a microphone 122, an interface unit 170, a second manipulating unit 132 and the like may be provided on a lateral surface thereof.

The display unit 151 may be configured to display (output) information being processed in the mobile terminal 100. The display unit 151 may include at least one of a liquid crystal display (LCD), a thin film transistor-liquid crystal display (TFT-LCD), an organic light emitting diode (OLED) display, a flexible display, a 3-dimensional (3D) display, and an e-ink display.

The display unit 151 may include a touch sensing mechanism to receive a control command by a touch method. When a touch is made to any one place on the display unit 151, the touch sensing mechanism may be configured to sense this touch and enter the content corresponding to the touched place. The content entered by a touch method may be a text or numerical value, or a menu item capable of indication or designation in various modes.

The touch sensing mechanism may be formed with transparency to allow visual information displayed on the display unit 151 to be seen, and may include a structure for enhancing the visibility of a touch screen at bright places. Referring to FIG. 3A, the display unit 151 occupies a most portion of the front surface of the front case 101.

The first audio output unit 153a and the first camera 121a are disposed in a region adjacent to one of both ends of the display unit 151, and the first manipulation input unit 131 and the microphone 122 are disposed in a region adjacent to the other end thereof. The second manipulation interface 132 (refer to FIG. 3B), the interface 170, and the like may be disposed on a lateral surface of the terminal body.

The first audio output module 153a may be a receiver for transferring voice sounds to the user's ear or a loud speaker for outputting various alarm sounds or multimedia reproduction sounds. It may be configured such that the sounds generated from the first audio output module 153a are released along an assembly gap between the structural bodies. In this instance, a hole independently formed to output audio sounds is not seen or hidden in terms of appearance, thereby further simplifying the appearance of the mobile terminal 100. However, the present invention may not be limited to this, but a hole for releasing the sounds may be formed on the window.

The first camera 121a processes video frames such as still or moving images obtained by the image sensor in a video call mode or capture mode. The processed video frames may be displayed on the display unit 151.

The user input unit 130 is manipulated to receive a command for controlling the operation of the mobile terminal 100. The user input unit 130 may include a first and a second manipulation unit 131, 132. The first and the second manipulation unit 131, 132 may be commonly referred to as a manipulating portion, and any method may be employed if it is a tactile manner allowing the user to perform manipulation with a tactile feeling such as touch, push, scroll or the like.

FIG. 3A illustrates the first manipulation unit 131 is a touch key, but the present disclosure is not limited to this. For example, the first manipulation unit 131 may be configured with a mechanical key, or a combination of a touch key and a mechanical key.

The content received by the first and/or second manipulation units 131, 132 may be set in various ways. For example, the first manipulation unit 131 may be used to receive a command such as menu, home key, cancel, search, or the like, and the second manipulation unit 132 may receive a command, such as controlling a volume level being outputted from the first audio output module 153a, or switching into a touch recognition mode of the display unit 151.

The microphone 122 may be formed to receive the user's voice, other sounds, or the like. The microphone 122 may be provided at a plurality of places, and configured to receive stereo sounds.

The interface unit 170 serves as a path allowing the mobile terminal 100 to exchange data with external devices. For example, the interface unit 170 may be at least one of a connection terminal for connecting to an earphone in a wired or wireless manner, a port for near field communication (for example, an Infrared Data Association (IrDA) port, a Bluetooth port, a wireless LAN port, and the like), and a power supply terminal for supplying power to the mobile terminal 100. The interface unit 170 may be implemented in the form of a socket for accommodating an external card such as Subscriber Identification Module (SIM) or User Identity Module (UIM), and a memory card for information storage.

Figure 3B:
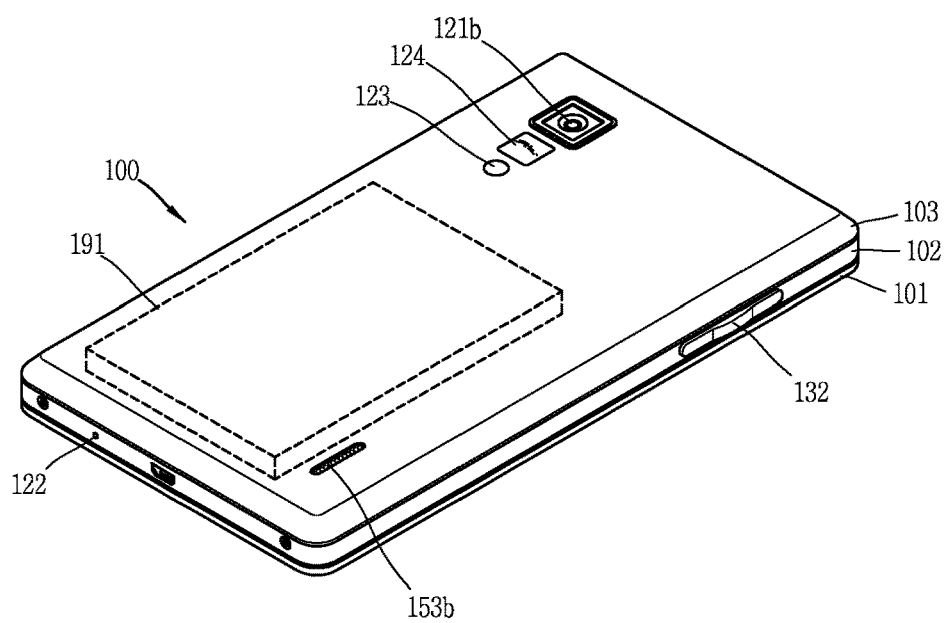
FIG. 3B is a perspective diagram illustrating the mobile terminal in FIG. 3A when viewed from the rear.

Next, FIG. 3B is a rear perspective view illustrating mobile terminal 100 illustrated in FIG. 3A. Referring to FIG. 3b, a second camera 121b may be additionally mounted at a rear surface of the terminal body, namely, the rear case 102. The second camera 121b has an image capturing direction, which is substantially opposite to the direction of the first camera unit 121a (refer to FIG. 3A), and may have a different number of pixels from that of the first camera unit 121a.

For example, it is preferable that the first camera 121a has a relatively small number of pixels enough not to cause difficulty when the user captures his or her own face and sends it to the other party during a video call or the like, and the second camera 121b has a relatively large number of pixels since the user often captures a general object that is not sent immediately. The first and the second camera 121a, 121b may be provided in the terminal body in a rotatable and popupable manner.

Furthermore, a flash 123 and a mirror 124 may be additionally disposed adjacent to the second camera 121b. The flash 123 illuminates light toward an object when capturing the object with the second camera 121b. The mirror 124 allows the user to look at his or her own face, or the like, in a reflected way when capturing himself or herself (in a self-portrait mode) by using the second camera 121b.

A second audio output unit 153b may be additionally disposed at a rear surface of the terminal body. The second audio output unit 153b together with the first audio output unit 153a can implement a stereo function, and may be also used to implement a speaker phone mode during a phone call.

An antenna for receiving broadcast signals may be additionally disposed at a lateral surface of the terminal body in addition to an antenna for making a phone call or the like. The antenna constituting part of the broadcast receiving module 111 may be provided in the terminal body in a retractable manner.

A power supply unit 190 for supplying power to the mobile terminal 100 may be mounted on the terminal body. The power supply unit 190 may be incorporated into the terminal body, or may include a battery 191 configured in a detachable manner on the outside of the terminal body. According to the drawing, it is illustrated that the battery cover 103 is combined with the rear case 102 to cover the battery 191, thereby restricting the battery 191 from being released and protecting the battery 191 from external shocks and foreign substances.

Figure 4:
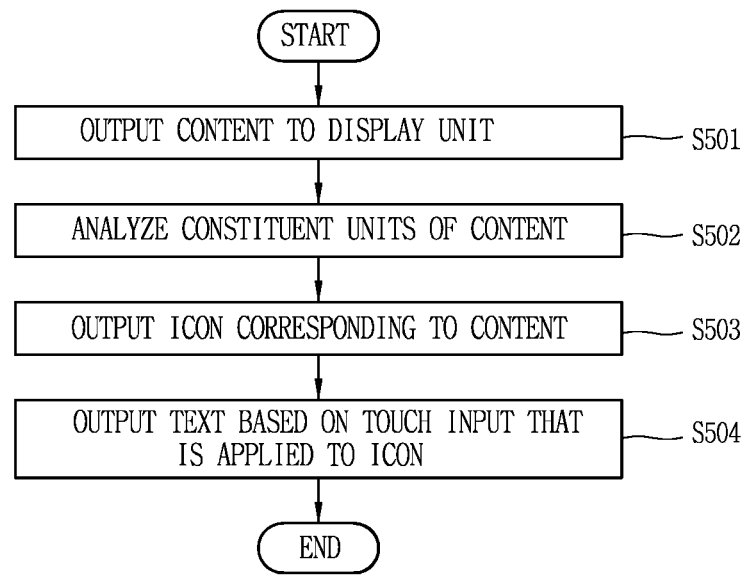
FIG. 4 is a flowchart illustrating a control method of the mobile terminal according to one embodiment of the present invention.
Figure 5:
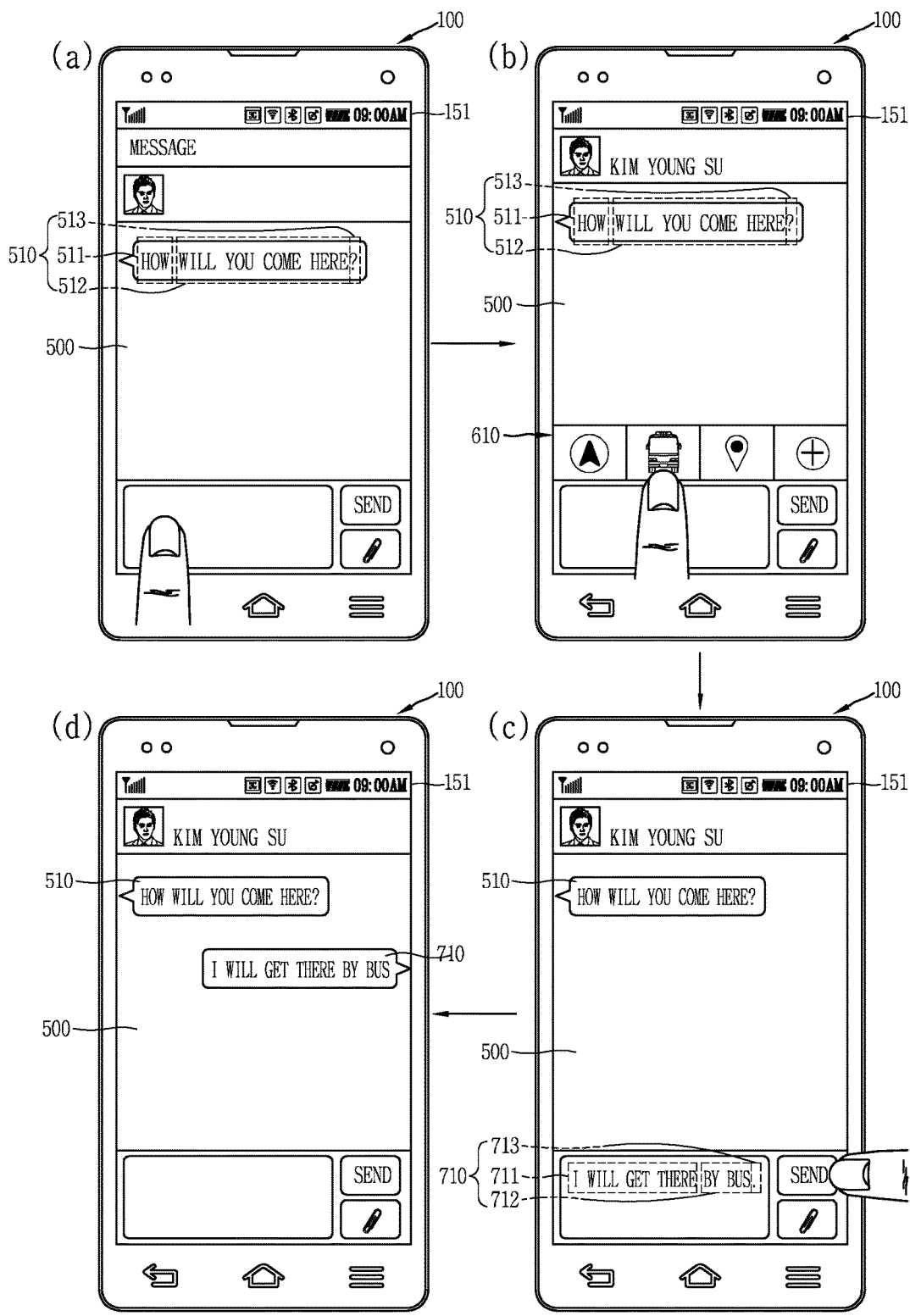
FIGS. 5(a) to 5(d) are diagrams illustrating the control method according to one embodiment in FIG. 4.

Next, FIG. 4 is a flowchart illustrating a method of controlling the mobile terminal according to one embodiment of the present invention and FIGS. 5(a) to 5(d) are diagrams for describing the control method in FIG. 4 according to one embodiment.

Referring to FIG. 4 and FIGS. 5(a) to 5(d), the controller 180 outputs screen information including at least one piece of content on the display unit 181 (S501). For example, as illustrated in FIG. 5, the screen information corresponds to an execution screen of a message application that transmits information to an external terminal. However, the screen information is not limited to that screen, but corresponds to an input window into which content (text, an image, a moving image, and the like) is input based on a control command that is applied to the mobile terminal.

The screen information includes at least one piece of content. The content means data that the display unit 151 and the audio output module 152 provide to the user, such as text, an image, a reproducible moving image file, sound data and the like.

Referring to FIG. 5(a), the display unit 151 outputs the execution screen of the message application. The execution screen includes a name of a representative name of the external terminal that transmits a message, the received message, and the like. For example, the screen information includes KIM YOUNG SU as the representative name of the external terminal and "How will you come here?" as the received message.

The controller analyzes a construction of the content (S502). The controller 180 analyzes a semantic component construction of first content 510, that is, constituent elements that make up a sentence. For example, the controller 180 divides the first content 510 into semantic component units and analyzes these. For example, the first content 510 is divided into "How" 511, "will you come here" 512, and "?" 513.

The controller 180 controls the display unit 503 so that an icon corresponding to the first content 510 is output (S503). The controller 180 is aware of a meaning of the content and predicts a response to the content. For example, the controller predicts a transportation means, a transportation method, a transportation destination, a current location, a time to the destination and so on using a combination of "How" and "will you come here."

The controller 180 controls the display unit so that details for the predicted responses are output as icons, based on a touch input that is applied to the input window for inputting text on the execution screen.

The controller 180 controls the display unit 151 so that the text is output, based on the touch input that is applied to the icon (S504). As illustrated in FIG. 5(b), the controller 180 outputs the display unit 151 so that multiple icons 610 to which the touch input is applied are output in order to output the text corresponding to the predicted response. For example, the multiple icons 610 include an icon for inputting a searched-for current location as text, an icon for inputting the public transportation to be used as text, an icon for inputting route information as text, and an addition icon for adding an icon for inputting different predicted information.

The controller 180 controls the display unit 151 so that text corresponding to the icon is output, based on the touch input applied to the icon. For example, the controller 180 controls the display unit 151 so that the text is output to the input window.

For example, the controller 180 controls the display unit 151 so that "I will get there" 711 is output to the input window, based on the touch input that is applied to a public transportation icon.

In addition, the controller 180 controls the display unit 151 so that letters (a word or a semantic component) corresponding to the analyzed sentence structure of the content 510 are output in order to output a response that is sentence-structured, which corresponding to the content 510. For example, the controller 180 controls the display unit 151 so that "by bus" 712 corresponding to "Will you come here" is output, according to the predicted response corresponding to the question.

That is, the controller 180 recognizes a subject, an object, a verb, an adverbial phrase, a predicate and so on of the content that is output to the display unit, and controls the display unit 151 so that the text corresponding to the sentence structure of the content are output according to the touch input that is applied to the icon.

In response to "How will you come here?," the controller 180 controls the display unit 151 so that text 710, "I'll get there by bus," is output, based on the touch input that is applied to the icon associated with the public transportation. That is, a first constituent unit 711, "I will get there," corresponds to "How" 511, a second constituent unit 712, "by bus," corresponds to "will you come here" 512, and a third constituent unit 713, ".", corresponds to "?" 513.

The controller 180 transmits the text to the external terminal, based on the touch input applied to a transmission icon SEND for transmitting text that is input into the input window on the input window. That is, the user can easily input information through the use of the icon that includes each text provided using the content included in the screen information.

In addition, the text is output that is made from one sentence that corresponds to the sentence structure as a result of analyzing the sentence structure of the text. Thus, the text that is more naturally sentence-structured is output.

Figure 6A:
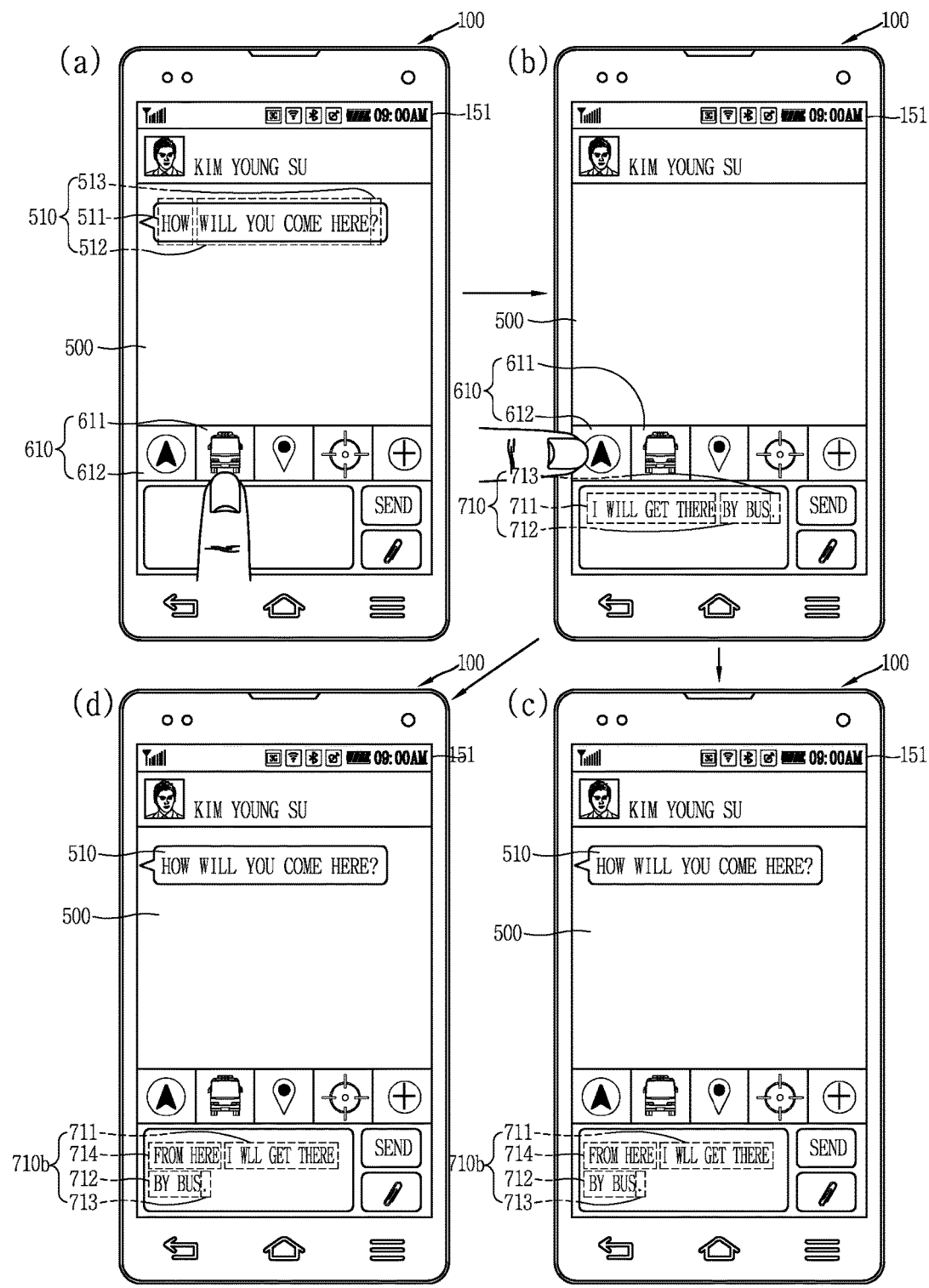
FIGS. 6A(a) to 6D(c) are diagrams illustrating a control method of outputting text using an icon according to various embodiments.

FIGS. 6A(a) to 6D(c) are diagrams for describing a control method of outputting the text using an icon according to various embodiments.

An arrangement of constituent elements that make up the text that is created based on the touch input that is applied to the icon is described referring to FIGS. 6A(a) to 6A(d). Referring to FIGS. 6A(a) and 6A(b), the display unit 151 includes the screen information including the content 510, and the controller 180 controls the display unit 151 so that the icon 610 associated with the response corresponding to the analyzed sentence structure of the content 510 is output. For example, the icon 610 includes a first image 611 indicating the public transportation and a second image 612 indicating the current location. The controller 180 controls the display unit 151 so that text 710, made from "i'll get there" 711, "by bus" 712, and "." 713, is output, based on the touch input that is applied to the first image 611.

Referring to FIGS. 6A(b) and 6A(c), after the touch input is applied to the first image 611, the controller 180 controls the display unit 151 so that the constituent unit that corresponds to the second image 612, that is, "from here" 714, is arranged after "by bus" 711, based on the touch input applied to the second image 612.

That is, the controller 180 controls the display unit 151 so that the text including constituent units, which correspond to the touch inputs input to the icon, respectively, in the order of applying the touch input, is output. That is, changed text 710a, "I'll get there by bus from here" composed in the order of applying the touch input to the icon, is output to the display unit. Accordingly, the user can output the text having the desired sentence structure, by sequentially applying the touch inputs to the icon.

Referring to FIGS. 6A(b) and 6A(d), the corresponding text is output based on the touch inputs applied to the first and second images 611 and 612. However, the controller 180 controls the display unit 151 so that the text that corresponds to the first and second graphic images 611 and 612 in the order of arranging the first and second graphic images 611 and 612 is output.

That is, the controller 180 controls the display unit 151 so that "from here" 714, the constituent unit corresponding to the second image 612, is arranged before "by bus" 711, the constituent unit corresponding to the first image 611 and then is output. That is, changed text 710b, "I'll get there by bus from here," in which the constituent units are arranged regardless of the order of applying the touch input to the icons, is output to the display unit. That is, even though the user applies the touch input to the icon corresponding to the text that is desired to be output without considering the sentence structure, the text is created according to the arrangement of the icons.

Figure 6B:
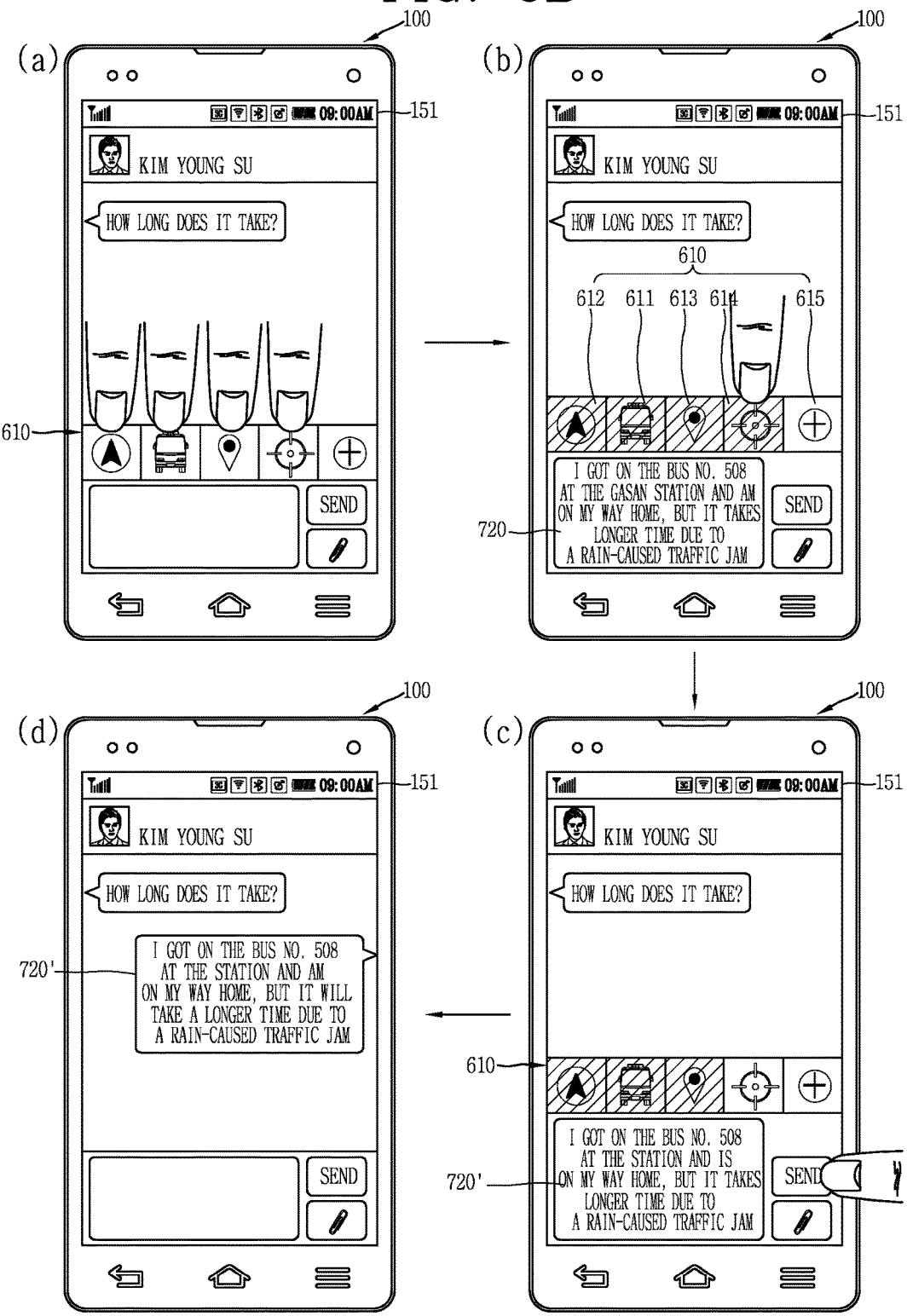

A method of controlling selection of the icon and cancellation of the selection is described referring to FIG. 6B(a) to 6B(d). Referring to FIG. 6B(a), the controller 180 controls the display unit 151 so that text 720 is output, based on the touch input applied to the multiple graphic images included in the icon 610. The controller 180 controls the display unit 151 so that the graphic image to which the touch input is applied is changed and is output. For example, when the touch input is applied to the graphic image and the sentence construction corresponding to this application of the touch input, the controller 180 controls the display unit 151 so that the graphic image is changed in color, light and shade, or the like and is output. For example, the text 720, "I got on the bus No. 508 at the GASAN station and is on my way home, but it takes longer time due to a rain-caused traffic jam" is output based on the touch input that is applied to the four graphic images.

Referring to FIG. 6B(b), when the touch input is again applied to any one of the graphic images that are input to which the touch input is applied, the controller 180 deletes the constituent unit of the text corresponding to the graphic image and controls the display unit 151 so that the graphic image is re-changed and is output. That is, the controller 180 controls the display unit 151 so that changed text 720,' "I got on the bus No. 508 at the GASAN station and am on my way home, but it will take a longer time due to a traffic jam" is output.

It is apparent to a person of ordinary skill in the art that, based on the touch input that is again applied to the graphic image, the construction of the corresponding text is again output. Accordingly, the user can easily amend the text by applying the touch input to the graphic image a number of multiple times. In addition, the selected image is changed and is output. Thus, the selected graphic image and the constituent unit of the text corresponding to the selected graphic image are recognized.

Figure 6C:
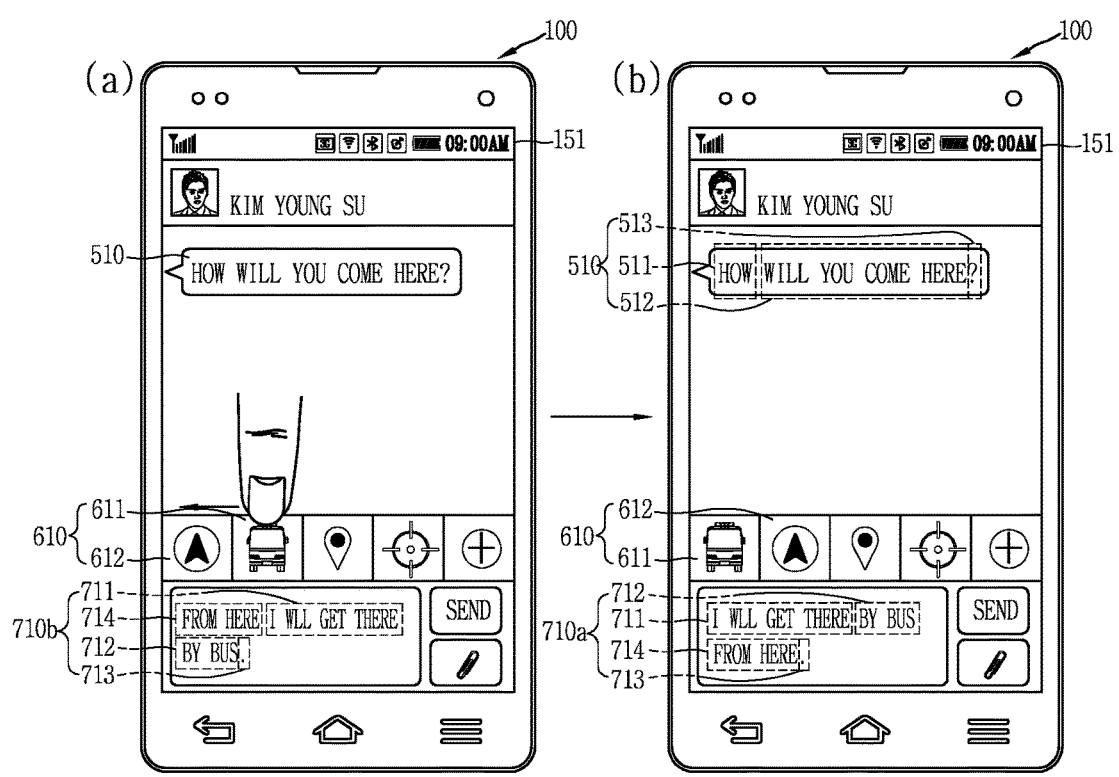

A method of amending the text by changing the arrangement of the multiple graphic images is described referring to FIGS. 6C(a) and 6C(b). Referring to FIGS. 6C(a) and 6C(b), the first and second graphic images 611 and 612 are output in this sequence, and the text 710b is output as "From here, I'll get there by bus."

The controller 180 changes the order in which the first and second graphic images 611 and 612 are output, by applying the touch input to the icon 610. For example, the controller 180 controls the display unit 151 so that the order in which the first and second graphic images 611 and 612 is changed, based on the successive touch inputs that are applied to the first graphic image and are moved.

The controller 180 controls the display unit 151 so that the constituent elements of the text corresponding to the first and second graphic images 611 and 612 are changed in arrangement and are output, based on the first and second graphic images 611 and 612 that are changed in arrangement. That is, when the first and second graphic images 611 and 612 are arranged in this sequence, the changed text 710a is output as "I'll get there by bus from here." That is, the user can change the order of the sentence construction that results in the text, by changing the arrangement of the graphic images.

Figure 6D:
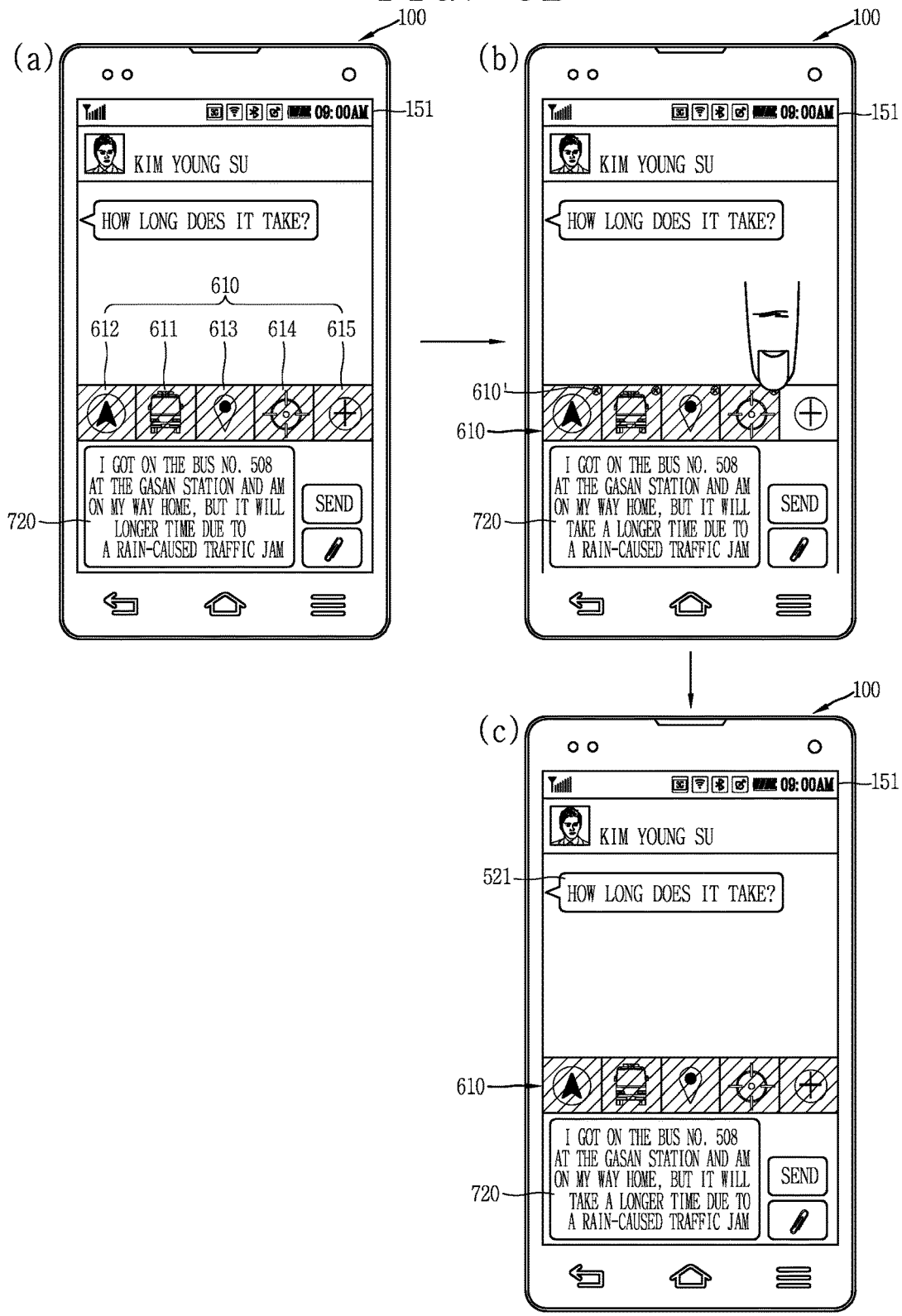

A control method of canceling the sentence construction according to the deletion of the icon is described referring to FIG. 6D(a) to 6D(c). Referring to FIG. 6D(a), the text 720 is output to the display unit, based on the touch input applied to the first to fifth graphic images 611 to 615 included in the icon 610.

The controller 180 controls the display unit 151 so that a deletion mark 610' for limiting the outputting of each graphic image is output, based on the touch input that is applied to the icon 610. The controller 180 controls the display unit 151 so that the outputting of the graphic image is limited, based on the touch input that is applied to the deletion mark 610'.

In addition, the controller 180 controls the display unit 151 so that the constituent element of the text corresponding to the graphic image is deleted by applying the touch input to the deletion mark 610'.

The deletion mark 610' is created so that it is superimposed on each graphic image, and thus limits the outputting of each graphic image and the text corresponding to each graphic image. Alternatively, the deletion mark 610' is created on the icon 610 that includes the multiple graphic images, so that the multiple graphic images can be deleted at a time and all the text can be deleted.

Accordingly, the user can delete the constituent units that make up the text, by deleting the graphic image.

In addition, the fifth image 615 is created so that the control command for adding the graphic image for outputting a different predicted response is applied to the fifth image 615.

Although not specifically illustrated in the drawings, the controller 180 controls the display unit 151 so that the graphic images corresponding to the predicted text are output according to a predetermined standard, based on the touch input that is applied to the fifth graphic image 615.

For example, the controller lines up the corresponding graphic images in the increasing order of the likelihood that the constituent unit will become the constituent unit of the text for the response. Then, the controller sequentially outputs the corresponding graphic images, based on the touch input that is applied to the fifth icon 615. In addition, the controller 180 controls the display unit in such manner that at least one of the graphic images that correspond to the constituent units of the predicted text, respectively, is output and the graphic image is added according to user's selection, based on the touch input that is applied to the fifth graphic image 615.

According to the present embodiment, the unnecessary constituent unit of the text is deleted by deleting the graphic image, the outputting of the unnecessary graphic image is limited, and the graphic image corresponding to the necessary component is added. Therefore, the user can output more conveniently the text that includes more various constituent units.

FIGS. 7(a) 7(c) is diagrams for describing a control method of outputting the text according to another embodiment.

Referring to FIGS. 7(a) to 7(c), a control method is described in which the text is output based on analysis of the content included in the screen information is described. Referring to FIG. 7(a), the display unit outputs the execution screen that includes a message that is received in the message application. The execution screen includes the first content 510 that is a message that is received, second content 510a that is a representative name of an external terminal, and third content 510b that is a message that is previously transmitted from the mobile terminal to the external terminal.

The controller 180 controls the display unit 151 so that the icon 610 is output as a result of analyzing the first content 510 and the text is output as a result of analyzing the second content 510a and the third content 510b, based on the touch input that is applied to the icon 610. For example, the controller selectively outputs a closing constituent unit of the text through the use of the second content 510a and the third content 510b.

The content 510a represents a sender who transmits the message and also a recipient to whom the user transmits the text, the controller searches for information related to the content 510a stored in the memory 160 of the mobile terminal. For example, the related information is stored in any one of a server, the memory 160, and a memory space for an application. The related information may be information that includes a representative name of the external terminal.

In addition, the third content 510b corresponds to the text that is transmitted by the user of the external terminal.

The controller determines the proper closing constituent unit for the user of the external terminal, based on the information related to the content 510a and the different text transmitted by the user. For example, if the closing constituent unit of the message that the user transmits to the external mobile terminal is a term of respect, the controller uses as the term of respect the closing constituent unit of the text that is generated by the touch input that is applied to the icon 610.

Referring to FIGS. 7(b) and 7(c), the closing constituent unit of the third content 510b corresponds to the term of respect, and the controller 180 controls the display unit 151 so that text 730 including the closing constituent unit "I'll get there" is output, based on the touch input that is applied to the icon 610.

The controller selects the closing constituent unit of the text, by combining the multiple pieces of information that results from the content included in the screen information.

Accordingly, the user can be provided with the details of the text that are selected. Furthermore, the user can be provided with more natural text because proper expressions are generated depending on how the text is practically used.

FIGS. 8A(a) to 8G(d) are diagrams for describing a control method of outputting information according to various embodiments.

A control method of outputting a current status of the user that results from analyzing the content is described referring to FIGS. 8A(a) to 8A(c). Referring to FIGS. 8A(a) and 8A(b), the display unit includes the screen information including the content 510, "How will you come here?" The screen information includes a status icon 620 "NOW" to which to apply the control command for detecting and outputting the current status.

The controller detects the current status of the mobile terminal and the current status of the user of the mobile terminal, based on the touch input that is applied to the status icon 620. In addition, the controller extracts information related to the content 510 from the current status detected.

For example, the controller extracts the user's moving route and moving status from the meaning of the semantic component "Will you come here?" in the content 510 and extracts the moving means from the meaning of the semantic component "How." Accordingly, the controller 180 controls the display unit 151 so that the moving status at the current location and the moving method are output. For example, the display unit outputs text 750 expressing the current status "I got on the bus No. 401 at the SUSEO station. I am stuck in a traffic jam."

Accordingly, the user can output information related to the user's current status corresponding to the content, based on the control command that is applied to the icon.

Figure 8B:
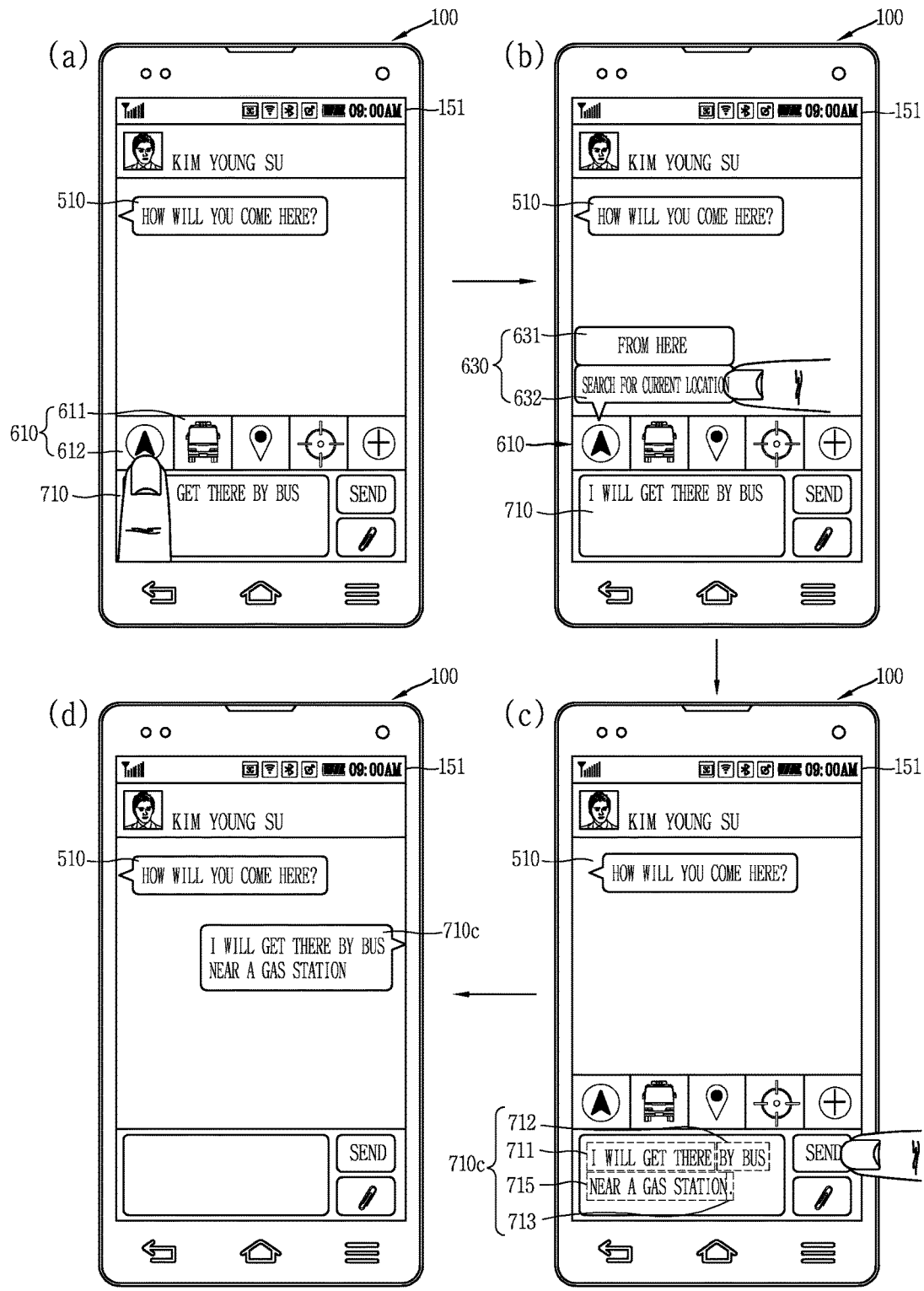
FIGS. 8A(a) to 8G(d) are diagrams illustrating a control method of outputting information according to various embodiments.

A control method of selecting and outputting the constituent unit of the text that corresponding to one graphic image is described referring to FIGS. 8B(a) to 8B(d).

Referring to FIGS. 8B(a) and 8B(b), the display unit outputs the content 510 and the icon 610. First text 710 is output based on the first graphic image 611.

The controller 180 controls the display unit 151 so that a text selection section 630 is output, based on the touch input that is applied to the second graphic image 612. The text selection section 630 includes first and second constituent units 631 and 632.

Referring to FIG. 8B(c), the second constituent unit 632 is displayed as "search for current location." If the touch input is applied to the second constituent unit 632, the controller searches for a current location of the mobile terminal. For example, the controller detects the current location of the mobile terminal using a GPS receiver and converts the result of the detection into semantic components. For example, the location that is converted into the semantic components corresponds to an address, a famous place in the vicinity, a specific location that is set by the user, and the like.

When the current location is detected as an area near a gas station, the controller 180 controls the display unit 151 so that text 710c to which the semantic component "near a gas station" 715 is added is output.

On the other hand, referring to FIG. 8B(d), the controller 180 controls the display unit 151 so that the text 710c to which a semantic component "from here" is added is output, based on the touch input that is applied to the first constituent unit 631.

That is, multiple different blocks of text are provided for one graphic image and the user can selectively output the text.

Figure 8C:
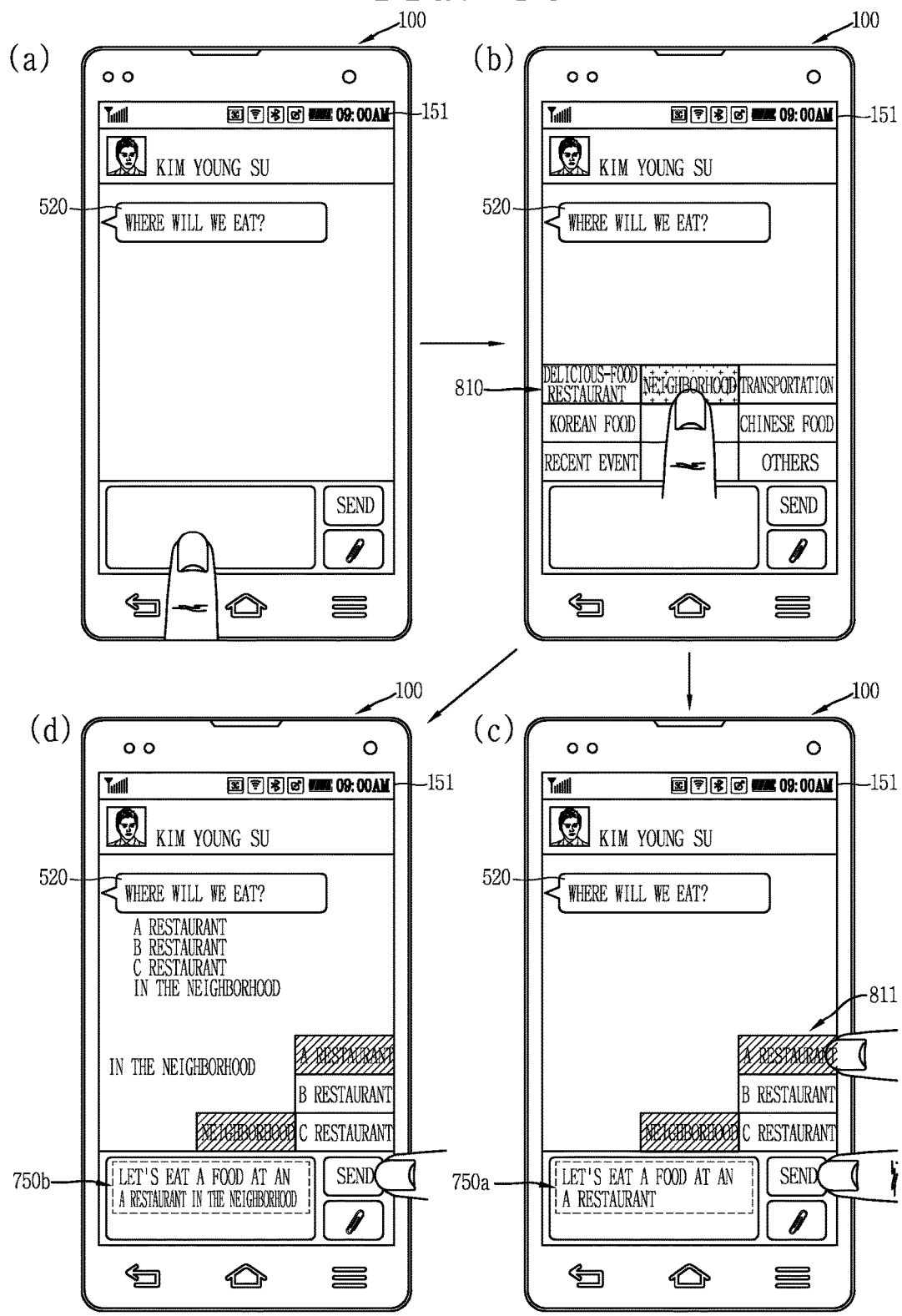

A control method of outputting the text related to the sequential pieces of information is described referring to FIG. 8C(a) to 8C(d). Referring to FIG. 8C(a), the screen information including content 520, "Where will we eat a food?," is output.

The controller analyzes the content 520. For example, information related to the location, which results from a semantic component "Where will" and information related to the restaurant, which results from a semantic component "we eat?" are combined to provide the information related to the content 520. As illustrated in FIG. 8C(c), the controller 180 controls the display unit 151 so that information window 810 including pieces of information generated by the content is output.

The information window 810 includes information related to the location and information related to the restaurant, for example pieces of information related to delicious-food restaurant, in the neighborhood, transportation, Korean food, Chinese food, recent event, and others. The user can apply the touch input to each piece of information to select it.

Referring to FIG. 8C(c), the controller 180 controls the display unit 151 so that low-level information 811 is output, based on the touch input that is applied to the information window 810. For example, the controller provides at least one piece of low-level information related to restaurants in the neighborhood, based on the touch input that is applied to "in the neighborhood."

The controller outputs text 750a, based on the touch input that is applied to the low-level information. According to the present embodiment, among the pieces of information, the controller converts into semantic components the information to which the touch input is applied and outputs the result of the conversion as constituent units of the text. The controller 180 controls the display unit 151 so that the text 750a, "Let's eat at restaurant A," is output, based on the A restaurant to which the touch input is applied and on the content 520.

On the other hand, referring to FIG. 8C(d), the controller creates the text, based on the touch input that is applied to the first information window 810 and the low-level information window 811. That is, the controller 180 controls the display unit 151 so that the result of applying the touch input to the first information window 810 to output the low-level information window 811 is converted into the information or the semantic component and is output as the constituent unit of the text.

That is, the controller 180 controls the display unit 151 so that the text "Let's eat at restaurant A in the neighborhood"

is output including as the constituent unit of the text the information (A restaurant, B restaurant, and C restaurant) "in the neighborhood" for outputting the information related to the restaurant.

Accordingly, the user can generate the text using the information that is provided in stages according to the analysis of the content.

Figure 8D:
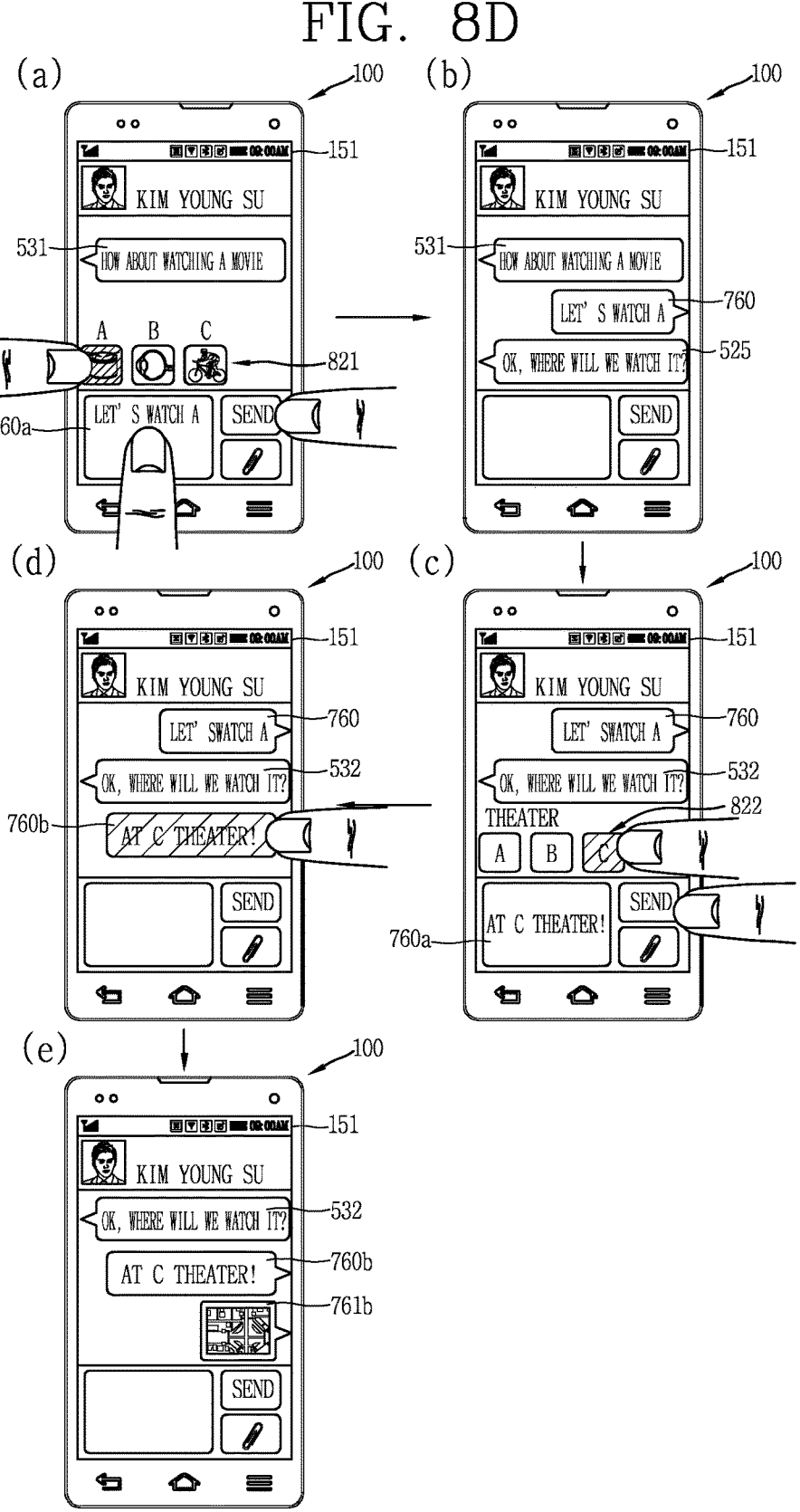

A control method of providing multiple selectable items in the same category with respect to the analyzed content described referring to FIGS. 8D(a) to 8D(d). The controller analyzes the content 524 and controls the display unit 151 so that the second information window 821 is output.

For example, the controller 180 controls the display unit 151 so that icons that correspond to multiple movies and to which the touch input is applied to output the multiple movies are output, using the movie included in the content 524 and a semantic component "How about watching a movie?" Movie information included in the second information window 821 is limited to the movie that is now on show. The icon corresponding to each of the movies is displayed as an image representing the movie, a movie poster, or the like, but is not limited to these.

The controller 180 controls the display unit 151 so that text, which corresponds to the movie and the semantic component "How about watching a movie?" are output, based on the user's touch input.

Referring to FIG. 8D(c), the controller analyzes content 532 that is additionally received from the external terminal and controls the display unit 151 so that a third information window 822 including an icon corresponding to a theater is output.

That is, if the selectable information within substantially the same category, which results from the analyzed content, is predicted, the controller 180 controls the display unit 151 so that the icon corresponding to each piece of information is output.

On the other hand, the controller 180 controls the display unit 151 so that the information corresponding to the icon is converted into text and the image corresponding to the information is output, based on the touch input that is applied to the icon.

A control method of outputting the image corresponding to the text that is output based on the touch input applied to the icon is described referring to FIG. 8E(a) to 8E(d).

The controller analyzes the content 510 and controls the display unit 151 so that the icon 610 is output. The control unit controls the display unit 151 so that the text 720 is output, based on the touch input that is applied to the icon 610.

Referring to FIGS. 8E(b) and 8E(c), the controller 180 controls the display unit 151 so that the image associated with the text is output, based on the control command that is applied to the text 720 that is input into the window.

For example, if the text 720 is "I got on the bus No. 508 at the GASAN station and am on my way home, but it will take a longer time due to a rain-caused traffic jam," images for the current location of the mobile terminal, the moving route, the weather, and so on are output.

As illustrated in FIG. 8E(c), the controller 180 controls the display unit 151 so that a running course of the bus and a road view of a place where the mobile terminal is located are output.

Although not specifically illustrated, the controller 180 controls the display unit 151 so that an image 720' corresponding to a word or a semantic component in the text, to which the touch input is applied is output. That is, the controller categorizes into semantic component units the text that is input into the input window and controls the display unit 151 so that the control command that is applied to the semantic component unit is detected.

The controller 180 controls the wireless communication unit 110 so that the image 720' that is output on the display unit is transmitted to the external terminal.

A control method of outputting the text using data stored in the memory 160 is described referring to FIGS. 8F(a) to 8F(e).

Referring to FIG. 8F(a), the display unit outputs the screen information including content 540. The controller extracts data related to the information including in the content 540 from the memory 160. For example, the content 540 includes a representative name of the external terminal, and the controller extracts data including the representative name and data that is transmitted to and is received from the external terminal, from the memory 160.

The controller 180 controls the display unit 151 so that a fourth information window 820 including data related to content stored in the memory 160 is output. The data corresponds to text, an image, a moving image, and the like.

According to one embodiment, the controller lines up and outputs the data according to a predetermined standard. For example, the controller lines up and outputs the data in chronological order in which the data is stored in the memory or in order of the number of times that the same data is output. The controller 180 controls the display unit 151 so that according to the predetermined standard, the data is changed in size and is output.

For example, the controller 180 analyzes a name MN JUNG and a present in the content and controls the display unit 151 so that the data having a representative name, MN JUNG is extracted from the memory 160 and is displayed.

That is, the user can be provided with the data without having to remember that it is stored in the memory and then to search for it.

In addition, referring to FIG. 8F(c), the controller 180 controls the display unit 151 so that data lower in level than the data included in the fourth information window 820 is output, based on the touch input that is applied to the fourth information window 820.

Although not specifically illustrated in the drawings, the controller 180 controls the display unit 151 so that an execution screen of an application including the selected data is output. For example, the controller 180 controls the display unit 151 so that the execution screen of the message application outputting the messages transmitted to and received from the external terminal is output.

In addition, referring to FIG. 8F(d), the controller 180 controls the display unit 151 so that the result of performing a search function with respect to the selected data is output.

In addition, the controller 180 controls the display unit 151 so that the text is output, based on the touch input of the data according to the result of the search and on details of the content of the screen information that is output on the display unit.

That is, the user can be provided rightly with the data, without displaying the execution screen of the application for executing a different function in order to be provided with the data. Additionally, the user can be provided not only with the data stored in the mobile terminal, but can be automatically provided also with the external data. Thus, it is possible to input text in a more convenient manner.

A method of controlling an additional function using the text that is output is described referring to FIG. 8G(a) to 8G(d).

Referring to FIG. 8G(a), the display unit outputs the screen information including the content 520 and text 751. The controller 180 controls the display unit 151 so that a fifth information window 751' that is selectable is output, based on the control command that is applied to the text 751.

For example, the fifth information window 751' is created 151 so that the control command for executing the additional function associated with the text 751 or outputting the additional information is applied to the fifth information window 751'. The fifth information window 751' includes a graphic image for outputting a location of the A restaurant and a graphic image for outputting a telephone number for making a reservation for a meal at the A restaurant. The two graphic images come from the text 751. The controller analyzes the details of the text 751 and generates the information for the fifth information window 751'.

For example, the controller outputs the location and the graphic image for controlling a reservation function through the meaning of the constituent units of the text "restaurant" and "Let's go." For example, if the text is "movie" the controller 180 controls the display unit 151 so that the graphic image to which the control command is applied is output to make a reservation for the movie or to output a location of theater.

Referring to FIG. 8G(c), the controller 180 controls the display unit 151 so that a map image 752 showing the location of the A restaurant is output, based on the touch input that is applied to the location. That is, the controller 180 controls the display unit 151 so that the location of the A restaurant is searched for and the searched-for map image 752 is output, based on the control command that is applied to the location.

Referring to FIG. 8G(d), the controller 180 controls the display unit 151 so that the telephone number of the A restaurant is searched for and the searched-for telephone number is output, based on the touch input that is applied to the reservation. However, the manner in which the controller 180 controls the display unit is not limited to all of this. The controller may control the display unit 151 so that a web page for reservation is provided or a telephone call application is executed.

FIGS. 9A(a) to 9F(d) are diagrams for describing a control method of cooperating with a different application using content according to various embodiments.

A control method of executing an application including data related to content is described referring to FIGS. 9A(a) to 9A(d). Referring FIG. 9A(a), the execution screen of the message application, which includes the messages transmitted to and received from the external terminal is output to the display unit.

For example, the screen information includes the text that is transmitted to and is received from the external terminal having the representative name "KIM MIN JUNG" The screen information includes the text including semantic components, such as "present," "I want to have a flower," and the like.

Referring to FIG. 9A(b), the display outputs the execution screen of the message application that causes the message transmitted from the external terminal representatively named KIM YOUNG SU to be included in the content 540.

Referring to FIGS. 9A(b) and 9A(c), the content 540 includes a sentence "What should I buy for MN JUNG?," and the controller outputs an icon 622 corresponding to information extracted from the memory space for the application, based on the information "What should I buy for MN JUNG?,"

For example, as described referring to FIG. 9A(a), using the semantic component "MIN JUNG" the controller extracts the message received from the external terminal representatively named "KIM MN JUNG" from the memory space for the message application.

The controller outputs a graphic image which includes at least one of an icon showing the message application and the details of the message and through which the message extracted from the memory space can be selected by the user's touch input.

In addition, the information included in the icon is not limited to text. For example, the controller extracts an image corresponding to the tagged semantic component "MIN JUNG" from a memory space for a gallery application and controls the display unit 151 so that a graphic image including the image is output.

The controller outputs the text 710 using the information extracted from the memory space for the application, based on the touch input that is applied to the icon 622. For example, the controller 180 controls the display unit 151 so that among semantic components in a text message, a predicted response is output, based on the touch input that is applied to the graphic image corresponding to the text message. Referring to FIG. 9A(d), the controller 180 controls analyzes semantic components "kind of flower" and "I want to have" in the text message and controls the display unit 151 so that "kind of flower are output.

That is, the controller extracts the semantic components from the text message and outputs the display unit 151 so that the semantic component corresponding to the content 540 is output as text. Although not illustrated in the drawings, the semantic component extracted from the text message and an additional semantic component as a response corresponding to the content 540 are output. For example, the controller adds "How about" as a response to "What should I buy?" and controls the display unit 151 so that the text "How about a kind of flower" is output.

Accordingly, the user can selectively output as text the information stored in a memory space for each of the multiple application that include the information corresponding to the content.

Figure 9B:
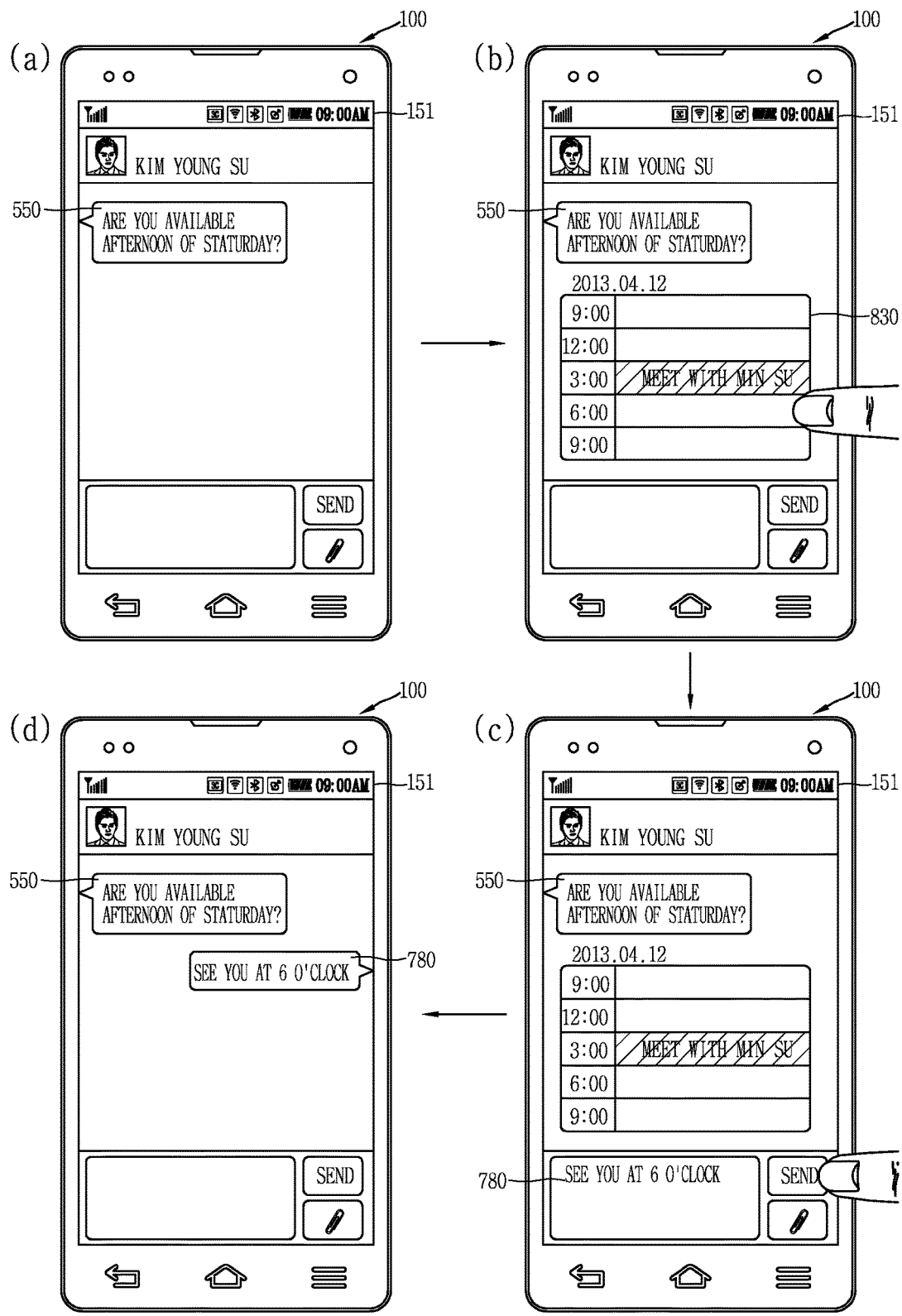
FIGS. 9A(a) to 9F(d) are diagrams illustrating a control method of cooperating with a different application using content according to various embodiments.

Referring to FIGS. 9B(a) to 9B(d), a control method is described in which the text is output based on the touch input that is applied to a sixth information window 830 that is stored in a memory space for a different application.

Referring to FIGS. 9A(a) and 9A(b), the controller 180 controls the display unit 151 so that a sixth information window 830 including one portion of the execution screen of the application is output, based on the content.

For example, the controller 180 controls the display unit 151 so that an execution of a calendar application is output, based on time included in the content. In addition, the controller 180 controls the display unit 151 so that the execution screen including the information related to a schedule for afternoon of Saturday that is already input, based on the semantic components "Saturday," and "afternoon."

Although not illustrated in the drawing, the controller outputs the sixth information window 830, using the content included in the screen information, and current status information on the mobile terminal that is detected. For example, if time information is included in the content and data information is not present, information to be output to the sixth information window 830 is extracted using a current date.

Referring to FIGS. 9B(b) and 9B(c), the controller 180 controls the display unit 151 so that text 780 corresponding to the screen information included in the sixth information window 830 is output, based on the touch that is applied to one region of the sixth information window 830.

For example, the sixth information window 830 includes multiple input regions that are partitioned according to the passage of time, and the controller outputs time corresponding to the input region to the text according to one input region to which the touch input is applied.

For example, the controller generates a constituent unit of the text "at six o'clock" based on the touch input that is applied to the input region corresponding to six o'clock. The controller outputs the text using the information that is included in the execution screen of the application and that is selected by the user. Thus, the controller provides the information stored in the memory space for the application to the user and outputs directly the information as text.

Referring to FIGS. 9C(a) to 9C(d), a control method is described in which text is output based on the touch input that is applied to the sixth information window 830 stored in the memory space for the application according to another embodiment.

The controller 180 controls the display unit 151 so that the execution screen of the calendar application, based on the content 550. Referring to FIG. 9C(b), the multiple input regions that result from the partitioning by the touch input are selected.

The controller 180 controls generates text 781 using the touch input that is applied to the input regions, 12 o'clock and six o'clock, of the execution of the application, and controls the display unit 151 so that the text 781 is output. For example, the text 781 corresponds to a sentence "I am available from twelve o'clock to three o'clock or after six o'clock."

Referring to FIGS. 9D(a) to 9D(d), a control method is described in which the multiple information windows, each including information different in category, are sequentially output in order to generate text using content.

Referring to FIGS. 9D(a) to 9D(d), the controller 180 controls the display unit 151 so that the sixth information window 830 including one portion of the execution screen of the message application, based on the content 550. In addition, the controller 180 controls the display unit 151 so that first text "See you at six o'clock" is output, based on the touch input that is applied to one region of the sixth information window 830.

In a state where the first text is output, the controller 180 controls the display unit 151 so that a seventh information window 831 is output, based on the content 550 according to the application of a predetermined control command or the passage of predetermined time (several seconds). For example, the seventh information window 831 includes pieces of information related to appointed time, such as place information, time information, and situation information.

The controller 180 controls the display unit 151 so that low-level pieces of information of each of the pieces of information described above are output, based on the touch input that is applied to the seventh information window 831. For example, icons associated with the place that is predicted as being input by the user are output, based on the touch input that is applied to the place.

The controller 180 controls the display unit 151 so that text is created and is output, based on the touch input that is applied to the icon.

Referring to FIGS. 9E(a) to 9E(d), a control method is described in which text is created based on the touch input that is applied to the calendar application. Referring to FIG.

9E(a), the controller 180 controls the display unit 151 so that the execution screen of the calendar application is output according to the content 551.

The controller outputs the execution screen of the calendar application displaying a date using a sentence that is made from "When" and "will we meet?" included in the content 551, but is not limited to that execution screen. That is, a different screen information including information corresponding to "When" may be output.

The controller 180 controls the display unit 151 so that text 783 is generated and is output, based on the touch input that is applied to at least one date included in an execution screen 640 of the calendar application.

A control method of performing the search function with respect to an icon and thus creating text is described referring to FIGS. 9F(a) to 9F(d). Referring to FIG. 9F(a), the controller outputs an icon including multiple graphic images, based on the content 520. The controller 180 controls the display unit 151 so that a different low-level icon 530 is output, based on the touch input that is applied to one graphic image.

For example, the controller 180 controls the display unit 151 so that low-level icons 630 including the multiple graphic images, each showing an adjacent restaurant, are output, based on the touch input that is applied to the graphic image corresponding to a location search. That is, the controller collects and extracts information related to the adjacent restaurant and provides the extracted information.

In addition, the controller 180 controls the display unit 151 so that a search screen 631 that results from searching for the information included in the low-level icon 630 is output, based on the touch input that is applied to the low-level icon 630. The search screen 631 includes information related to each restaurant (for example, the location, the menu, the restaurant assessment and the like).

The controller 180 controls the display unit 151 so that a low-level icon 632 for the restaurant is output, based on the touch input that is applied to any of the pieces of information included in the search screen 631. The controller 180 controls the display unit 151 so that the text is output, based on the touch input that is applied to the low-level icon 632.

According to the present embodiment, at least a low-level search process and a process of outputting the search screen are included in order to output the icon to which the touch input is applied to input the text.

In addition, the controller 180 controls the display unit 151 so that the information that is output to the search screen is created as text and is output.

Accordingly, the user can be conveniently provided with a lot of information without separately executing a search application and output the piece of information as text.

FIGS. 10A(a) to 10E(d) are diagrams for describing a control method of analyzing an image and executing a prediction function.

A control method of detecting information included in an image and providing a wireless signal to an external terminal is described referring to FIGS. 10A(a) to 10A(c). FIG. 10A(a) illustrates a screen information including content that is made from an image 560 and the screen information corresponds to the execution of the gallery application.

The controller analyzes information included in the image 560. For example, if a photo of a person is included in the image 560, the controller searches for information related to the person, among pieces of information corresponding to an external terminal, which are stored in the mobile terminal, and provides the person-related information to an external terminal corresponding to the person-related information.

Referring to FIG. 10A(b), the controller outputs the execution screen for sharing the content that is made from the image 560, and controls the display unit 151 so that an icon 640 including an image related to the image 560 is output. For example, the icon 640 includes a photo that includes a person that is recognized as substantially the same person as at least one person included in the image 560, a photo of a person related to (for example, a person who is a friend of, or who has the same group membership as) the person included in the image 560 in SNS, and information related to the group to which the person belongs.

The controller performs control so that the image 640 is shared, based on the touch input that is applied to the icon 640. However, a function is not limited to the sharing function, and a function of transmitting a message and other functions are included.

Although not illustrated in the drawings, an image included in the screen of the application in which the message is desired to be transmitted is analyzed, and information related to the image is provided as text.

That is, bases on the analysis of the content that is made from the image, the user can execute functions, such as sharing or transmitting the content with or to the external terminal corresponding to the information related to the analysis of the content. Therefore, the user can conveniently execute the function without having to search for the external terminal with which wireless communication is desired to be established.

Referring to FIGS. 10B(a) to 10B(d), a control method is described in which an icon that is made from an image is output based on content.

Referring to FIGS. 10B(a) and 10B(b), the controller 180 controls the display unit 151 so that an icon 641 including a list for outputting multiple images and a different screen information is output, based on content 561. For example, the content corresponds to a sentence that is made from semantic components such as "yesterday," and "a photo that was taken," and the controller 180 controls the display unit 151 so that photos that were taken and stored are output. In addition, the controller 180 controls the display unit 151 so that a list to which a command to execute an application through which to check the photos that were taken yesterday and stored is applied is output.

The controller 180 controls the display unit 151 so that the photo is output to the input window and text "I'll send you" corresponding to "Please send me" included in the content 561 is output together, based on the touch input that is applied to the photo (image) included in the icon 641.

That is, the user can be provided not only with the text that is predicted through the use of the content, but also with the image (including a moving image file and the like) that can be transmitted. Thus, the user can transmit the messages and the like more conveniently.

A control method of selecting at least one image among multiple images that are output through the use of content is described referring to FIGS. 10C(a) to 10C(d).

Referring to FIGS. 10C(a) and 10(*b*), the controller 180 controls the display unit 151 so that an icon 642 including the photos that were taken yesterday is output through the user of the content.

Referring to FIG. 10C(c), the controller 180 controls the display unit 151 so that the photo selected from among the photos described above is displayed as highlighted. For example, the selected photo is output as changed in size, or is output with the edge highlighted, or is output as changed in brightness and saturation.

The controller 180 controls the display unit 151 so that the multiple photos are selected and are selected as highlighted, based on the multiple touch inputs that are applied to the icon 642.

If at least one photo is selected, the controller 180 controls the display unit 151 so that at least the selected one photo is transmitted to a predetermined external terminal, based on the touch input that is applied to the graphic image through which transmission of a message is controlled.

However, a function is not limited to this function. When the different touch input is applied to at least the selected one photo, the controller may control the display unit 151 so that the photo is displayed on the input window.

Figure 10D:
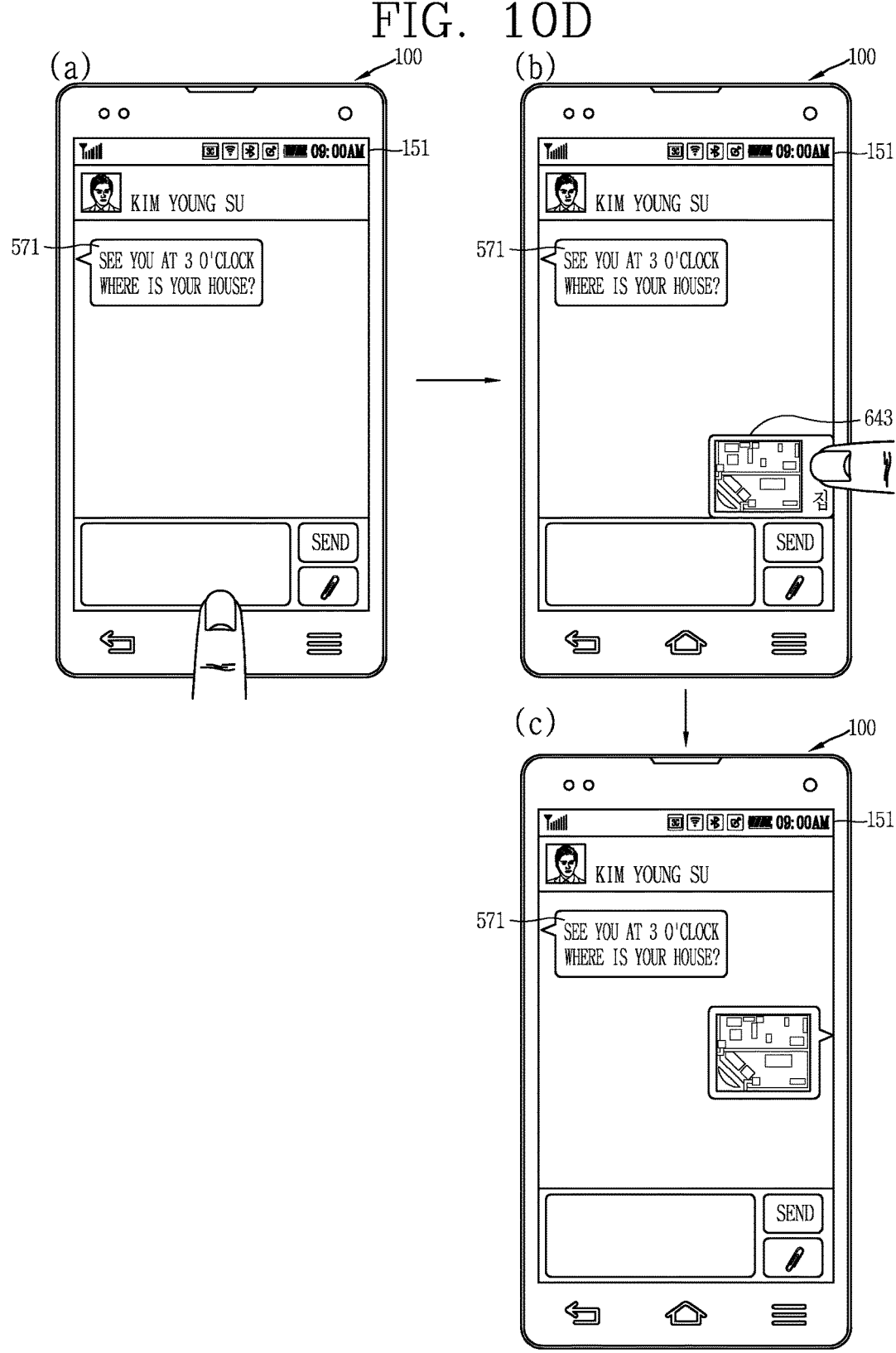
FIGS. 10A(a) to 10E(d) are diagrams illustrating a control method of analyzing an image and executing a prediction function.

A control method of providing as an image a result of the search that is based on content is described referring to FIGS. 10D(a) to 10D(c). Referring to FIGS. 10D(a) to 10D(b), the control unit searches for information related to content 571. For example, if the content 571 includes a sentence "Where is your house located?" the controller searches for information related to a location of the house.

The controller 180 controls the display unit 151 so that image information related to the location of the house is output. Therefore, the user can transmit check the image related to the location of the house and then transmit it to the external terminal.

Figure 10E:
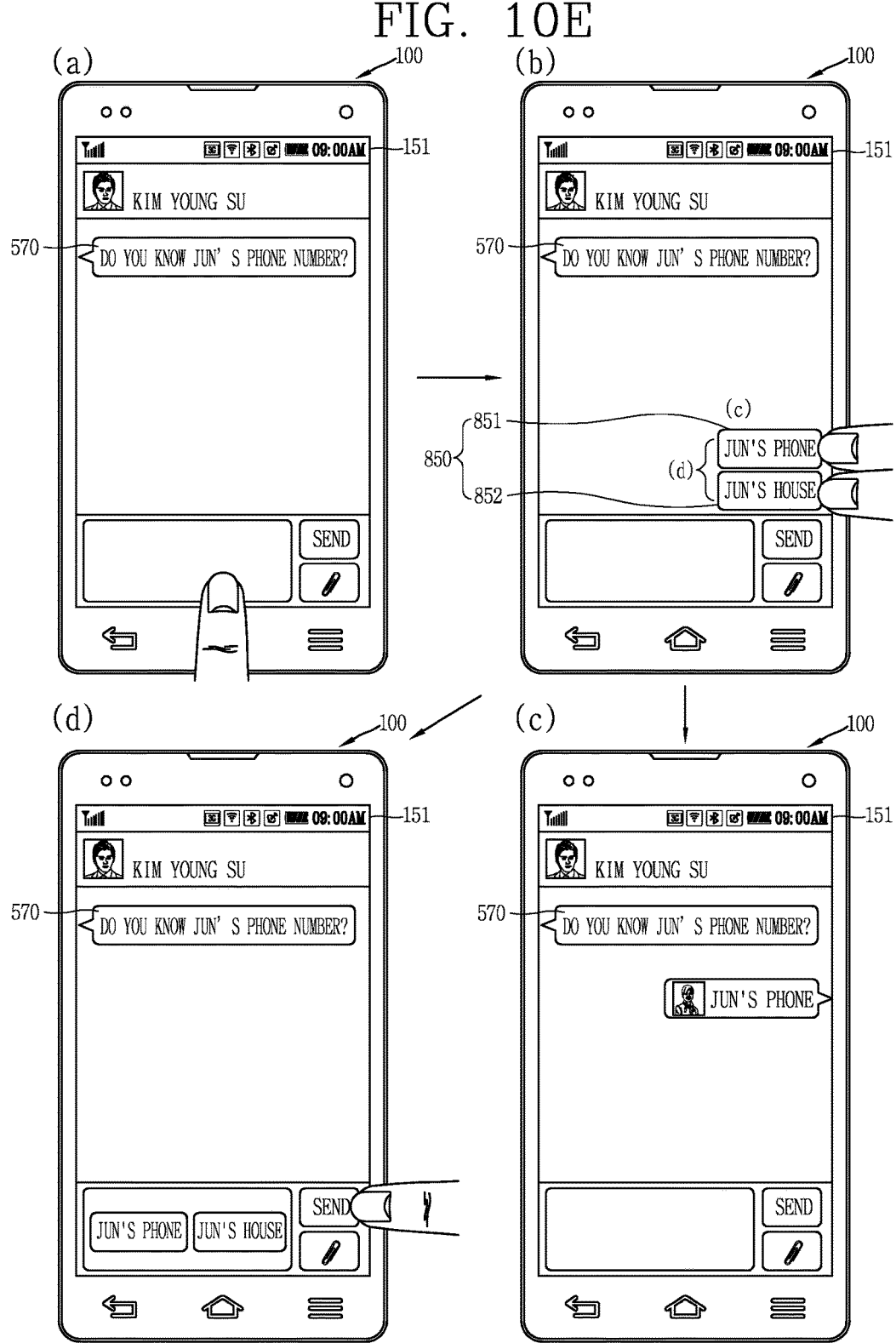

A control method of providing multiple pieces of information that are searched for, based on content is described referring to FIG. 10E(a) to 10E(d).

Referring to FIGS. 10E(a) and 10E(b), the controller 180 controls the display unit 151 so that an icon 850 including first search information 851 and second search information 852 that are searched for, based on content 570 is output.

For example, when the content includes a semantic unit "JUN's phone number," the controller searches the memory 160 for information using the words. The controller creates phone information on a portable terminal, which includes a representative name "JUN," and home phone number information, which includes the representative name "JUN," as the first search information 851 and the second search information 852 and outputs them.

The controller transmits at least one piece of information among the first search information 851 and the second search information 852 to the external terminal, based on the touch input that is applied to the icon 850.

The controller 180 controls the display unit 151 so that the result of the search including the phone number information is created as text and is output. For example, when the text "JUN's PHONE" is output and the touch input is applied to "JUN's PHONE," the controller 180 performs control so that the text is transmitted with information related to the phone number included.

The controller 180 controls the display unit 151 so that the text corresponding to the first search information 851 and the second search information 852 are output to the input window, based on the touch input that is applied to all of the first search information 851 and the second search information 852.

Although not illustrated in the drawings, the controller performs control so that the result of the search, as is, is output on the display unit.

FIGS. 11A to 11C are diagrams for describing a control method of providing an icon including multiple graphic images. Referring to FIGS. 11A and 11B, the controller outputs the icon 610 including the multiple graphic images, based on the content.

The controller 180 controls the display unit 151 so that the icon 610 is output including different graphic images, based on the touch input according to a predetermined method, which is applied to the icon 610.

It is preferable that the touch input be distinguished from a touch input through which to select one graphic image. For example, the touch input according to the predetermined method corresponds to a touch input according to a dragging method, in which the selected icon is continuously dragged in one direction.

The controller 180 controls the display unit 151 so that one portion or all portions of the graphic image included in the icon 610 is switched to a different graphic image, based on the touch input. Here, the graphic image corresponds to a graphic image including information substantially related to the content.

Accordingly, the user can be provided more conveniently with various graphic images for outputting multiple pieces of information.

A control method of outputting multiple graphic images each of which corresponds to content and is included in the same category is described referring to FIGS. 12A(a) to 12A(c) and FIGS. 12B(a) to 12B(d).

Referring to FIGS. 12A(a) and 23A(b), the controller 180 controls the display unit 151 so that multiple graphic image 650 are output as a response corresponding to content 580 including a semantic component "Good night."

The graphic image corresponds to the response to the content 580. The graphic image 650 is made from various types of information such as letters, images, and moving images.

The controller 180 performs control so that the graphic image 650 corresponding to a predetermined semantic component (or an image and others) that makes up the content 650 is stored in the memory 160. Information included in the graphic image 650 is created based on a recording that is stored or output by the user.

For example, the controller 180 controls the display unit 151 so that the multiple graphic images corresponding to the content 650 are output in order of frequency in use or in order that is predetermined by the user.

Accordingly, if the user desires to transmit repetitive responses to the content, he/she can do this more handily.

Referring to FIGS. 12B(a) to 12B(d), a control method is described in which a graphic image including pieces of information that are substantially the same type is output based on content.

Referring to FIGS. 12B(a) and 12B(b), the controller 180 controls the display unit 151 so that an icon 660 that is made from multiple graphic images including different emoticons related to a feeling is output, based on content including a sentence "How do you feel?" The emoticon is created in the shape of a human face expressing different feelings.

The controller 180 controls the display unit 151 so that text expressing the emoticon is output, based on the control command that is applied to one graphic image. For example, the controller 180 controls the display unit 151 so that text "I am angry," is output, based on the touch input that is applied to one graphic image.

Accordingly, the user can prepare more handily for the responses to the text, which has a different meaning and are in substantially the same emotion category.

The configuration and the method relating to the mobile terminal and the mobile terminal equipped with a cover described above according to the embodiments are not applied in a limiting manner, but all of or some of the embodiments may be selectively combined with each other to create various modifications to the embodiments.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a wireless communication processor configured to receive message from an external terminal;
a touch screen; and
a controller configured to:
cause the touch screen to display an execution screen of a message application comprising a received message from the external terminal via the wireless communication processor,
analyze a meaning of the received message and one or more constituent units of the received message, wherein the one or more constituent units comprises at least one of a subject, an object, a verb, and an adverbial phrase,
predict at least one response to the received message based on the meaning of the received message and the one or more constituent units,
display, on the touch screen, at least one icon corresponding to the at least one predicted response,
display a first text portion as a part of a response message to the received message, in response to a touch input on the at least one icon, wherein a meaning of the first text portion corresponds to a predicted response corresponding to the at least one icon,
display a second text portion as a remaining part of the response message, and
transmit, via the wireless communication processor, the response message to the external terminal,
wherein constituent units of the first text portion and the second text portion correspond to the analyzed one or more constituent units of the received message.

2. The mobile terminal of claim 1, further comprising a memory configured to store data transmitted and received from the external terminal.

3. The mobile terminal of claim 2, wherein the at least one icon includes a plurality of graphic images, and
wherein each respective graphic image includes data different from data included with any other graphic image among the plurality of graphic images.

4. The mobile terminal of claim 3, wherein each respective graphic image includes multiple pieces of information, and
wherein the controller is further configured to output the multiple pieces of information.

5. The mobile terminal of claim 3, wherein the controller is further configured to output, based on the touch input, at least one portion of text based on the multiple pieces of information.

6. The mobile terminal of claim 5, wherein the at least one portion of text based on the touch input is responsive to the content.

7. The mobile terminal of claim 6, wherein the at least one portion of text is related to the graphic image.

8. The mobile terminal of claim 7, wherein the controller is configured to receive multiple touch inputs, each touch input applied to a different graphic image.

9. The mobile terminal of claim 8, wherein, responsive to each touch input applied, the controller is further configured to output a portion of text different from portions of text output responsive to any other touch input.

10. The mobile terminal of claim 3, wherein a combination of the respective portions of text is responsive to the content.

11. The mobile terminal of claim 5, wherein the at least one portion of text based on the touch input is further based on current terminal information regarding the mobile terminal.

12. The mobile terminal of claim 11, wherein the current terminal information is location information.

13. The mobile terminal of claim 2, wherein the controller is further configured to display a search icon that includes a search window containing information to be searched, based on the content.

14. The mobile terminal of claim 13, wherein the controller is further configured to execute a search for information related to the content, responsive to the touch input.

15. The mobile terminal of claim 14, wherein the controller is further configured to output a search result responsive to the search for information related to the content.

16. A method of generating text in response to a content in a mobile terminal, the method comprising:
receiving a message from an external terminal;
displaying, on a touch screen, an execution screen of a message application comprising a received message from the external terminal via a wireless communication processor;
analyzing a meaning of the received message and one or more constituent units of the received message, wherein the one or more constituent units comprises at least one of a subject, an object, a verb, and an adverbial phrase;
predicting at least one response to the received message based on the meaning of the received message and the one or more constituent units;
displaying, on the touch screen, at least one icon corresponding to the at least one predicted response;
displaying, on the touch screen, a first text portion as a part of a response message to the received message, in response to a touch input on an icon among the at least one icon, wherein a meaning of the first text portion corresponds to a predicted response corresponding to the icon;
displaying, on the touch screen, a second text portion as a remaining part of the response message; and
transmitting, via the wireless communication processor, the response message to the external terminal,
wherein constituent units of the first text portion and the second text portion correspond to the analyzed one or more constituent units of the received message.

17. The method of claim 16, wherein each respective icon includes at least one graphic and each graphic is based on at least one semantic component of the respective constituent unit.

18. The method of claim 17, wherein the text information is text responsive to the content.

19. The mobile terminal of claim 1, wherein the controller is further configured to:
change an arrangement of the displayed text based on an arrangement of the at least one icon; and
transmit the text to the external terminal when a touch input is applied to a preset image displayed with the text.

* * * * *